(12) United States Patent
Abiko

(10) Patent No.: US 7,801,340 B2
(45) Date of Patent: Sep. 21, 2010

(54) BIOMETRIC INFORMATION OBTAINING APPARATUS

(75) Inventor: Yukihiro Abiko, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 12/139,239

(22) Filed: Jun. 13, 2008

(65) Prior Publication Data

US 2008/0247614 A1 Oct. 9, 2008

Related U.S. Application Data

(62) Division of application No. 10/819,264, filed on Apr. 7, 2004.

(30) Foreign Application Priority Data

Nov. 17, 2003 (JP) ............................. 2003-386752

(51) Int. Cl.
 *G06K 9/78* (2006.01)
(52) U.S. Cl. ...................................... 382/124
(58) Field of Classification Search ................. 382/124
 See application file for complete search history.

(56) References Cited

U.S. PATENT DOCUMENTS

| 5,177,802 | A | 1/1993 | Fujimoto et al. | |
|---|---|---|---|---|
| 6,289,114 | B1 | 9/2001 | Mainguet | |
| 6,317,508 | B1 | 11/2001 | Kramer et al. | |
| 7,079,671 | B2 | 7/2006 | Morihara et al. | |
| 7,197,168 | B2* | 3/2007 | Russo | ........................ 382/125 |
| 2002/0012455 | A1 | 1/2002 | Benckert | |
| 2002/0067845 | A1* | 6/2002 | Griffis | ........................ 382/107 |
| 2002/0141622 | A1 | 10/2002 | Yamaguchi | |
| 2003/0021451 | A1 | 1/2003 | Lee | |
| 2003/0123714 | A1 | 7/2003 | O'Gorman | |
| 2003/0126448 | A1 | 7/2003 | Russo | |
| 2003/0161502 | A1 | 8/2003 | Morihara et al. | |
| 2003/0161510 | A1 | 8/2003 | Fujii | |
| 2003/0179910 | A1* | 9/2003 | Wong | ........................ 382/115 |

FOREIGN PATENT DOCUMENTS

| DE | 10109560 | 9/2002 |
|---|---|---|
| EP | 1 139 271 | 10/2001 |

(Continued)

OTHER PUBLICATIONS

European Office Action dated Oct. 18, 2006 for corresponding European Patent Application No. 04 009 258.7-2218.

(Continued)

*Primary Examiner*—Vu Le
*Assistant Examiner*—Michael Vanchy, Jr.
(74) *Attorney, Agent, or Firm*—Staas & Halsey LLP

(57) ABSTRACT

The apparatus enables a user to recognize the way he is moving his finger with respect to, for example, a sweep-type fingerprint sensor so that the user can easily and surely learn an appropriate way the finger (body part) should be moved. A velocity detecting means detects a velocity at which the body part moves with respect to a sensor, and an image generating means generates an arbitrary pattern, of which a portion corresponding to a position where the body part is located when the movement velocity is detected is altered according to the detected movement velocity, and the generated pattern is shown on a display.

11 Claims, 20 Drawing Sheets

FOREIGN PATENT DOCUMENTS

| | | |
|---|---|---|
| EP | 1 179 801 A2 | 2/2002 |
| EP | 1 179 801 A3 | 2/2002 |
| JP | HEI 4-120671 | 4/1992 |
| JP | HEI 4-190470 | 7/1992 |
| JP | HEI 5-108808 | 4/1993 |
| JP | 8-154921 | 6/1996 |
| JP | HEI 8-147465 | 6/1996 |
| JP | HEI 10-91769 | 4/1998 |
| JP | HEI 11-253428 | 9/1999 |
| JP | 2002-123823 | 4/2002 |
| JP | 2002-177623 | 6/2002 |
| JP | 2002-517835 | 6/2002 |
| JP | 2002-288643 | 10/2002 |
| JP | 2002-532809 | 10/2002 |
| JP | 2002-366950 | 12/2002 |
| JP | 2003-30629 | 1/2003 |
| JP | 2003-30630 | 1/2003 |
| JP | 2003-242489 | 8/2003 |
| WO | WO 98/58342 | 12/1998 |
| WO | WO 99/63476 | 12/1999 |
| WO | WO 00/36548 | 6/2000 |
| WO | WO 03/007127 | 1/2003 |

OTHER PUBLICATIONS

Japanese Office Action dated Nov. 14, 2007 for corresponding Japanese Patent Application No. 2003-386752.

U.S. Appl. No. 10/819,264, filed Apr. 7, 2004, Yukihiro Abiko, Fujitsu Limited.

Office Action mailed Nov. 19, 2009 in parent U.S. Appl. No. 10/819,264.

\* cited by examiner

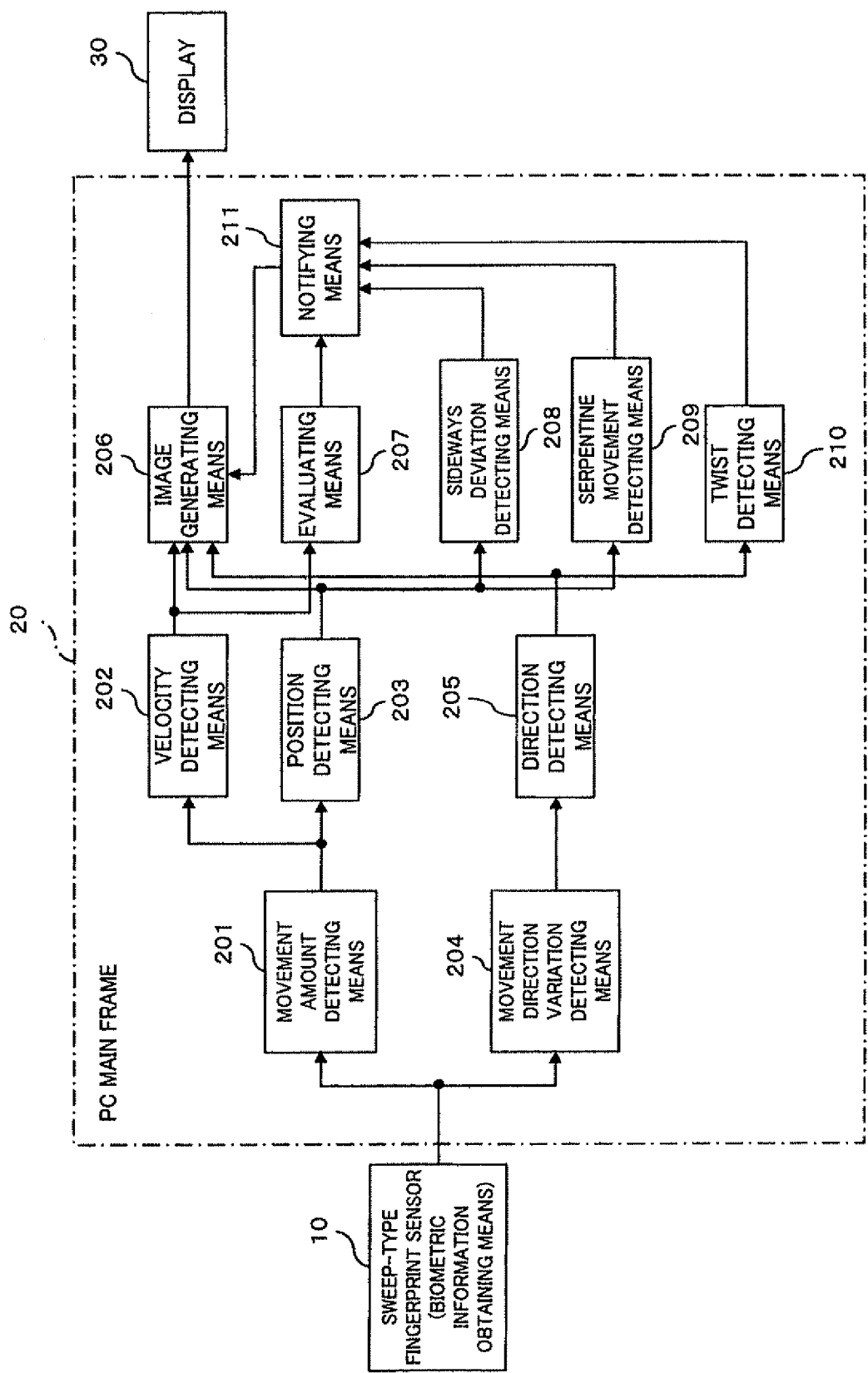

FIG. 6A   FIG. 6B
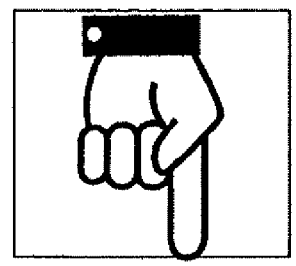
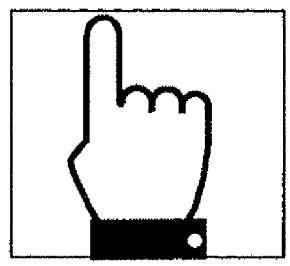
FIG. 7A   FIG. 7B      FIG. 8A   FIG. 8B
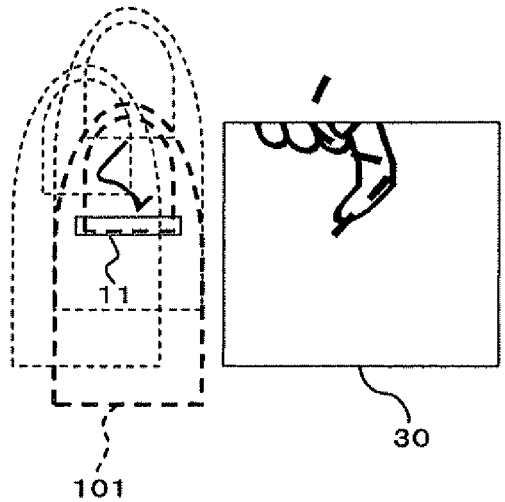
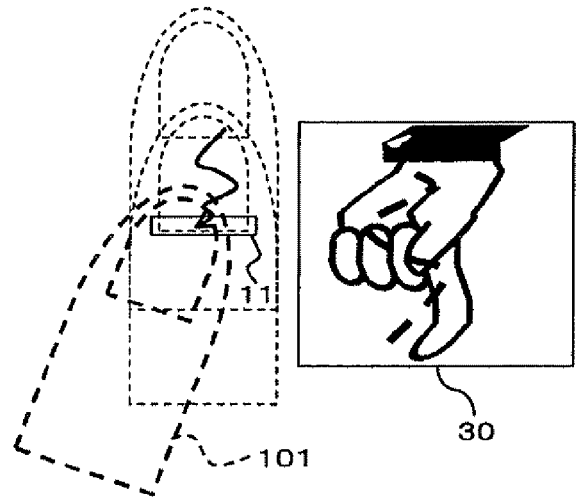

FIG. 9
FIG. 10A  FIG. 10B      FIG. 11A  FIG. 11B
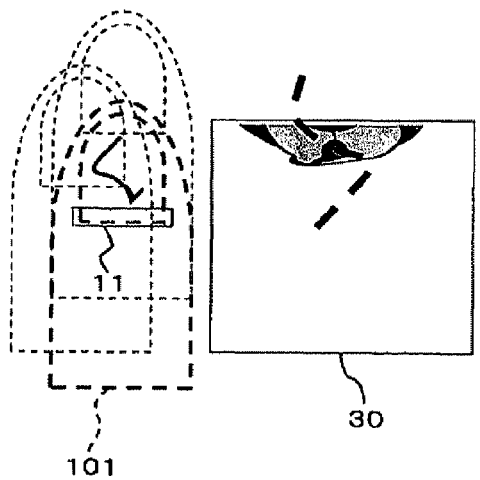
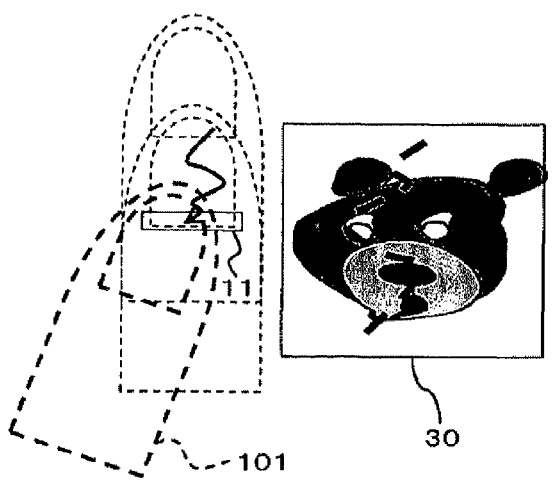

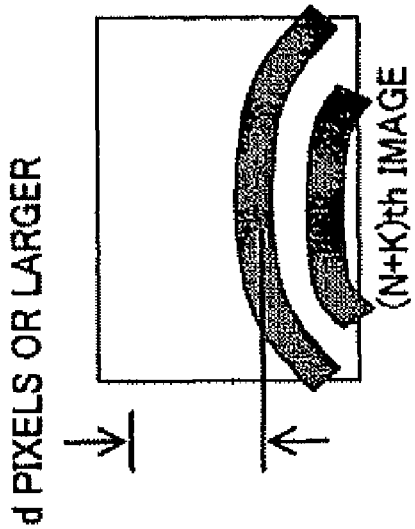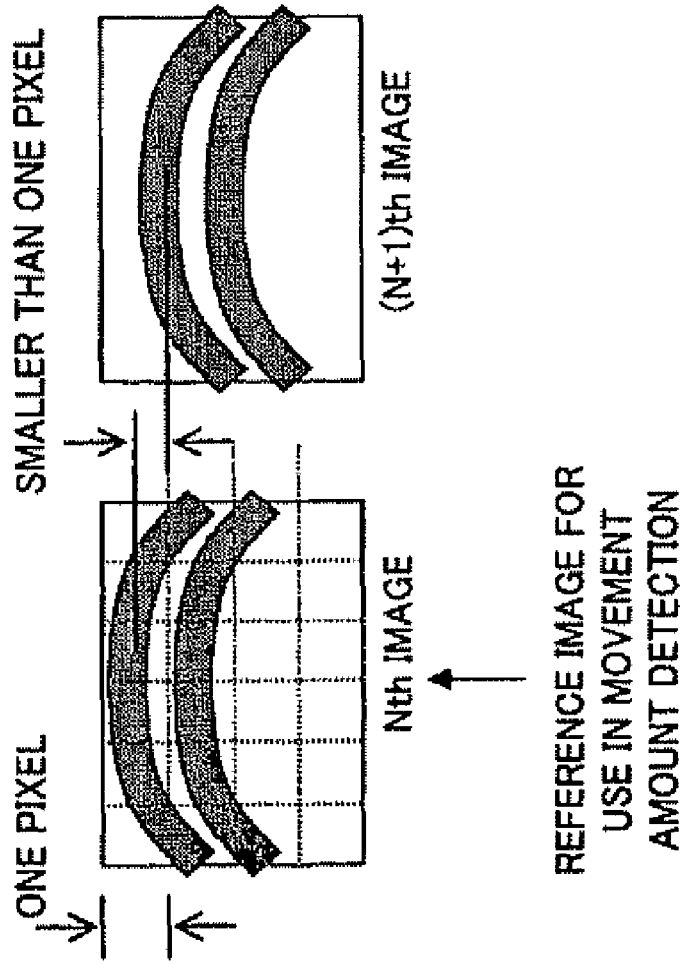

Nth IMAGE (REFERENCE IMAGE)

(N+1)th IMAGE

PROCEDURE 1: DETECTING A MOVEMENT AMOUNT

PROCEDURE 2: DETECTING AN ANGULAR DISPLACEMENT

BIOMETRIC INFORMATION OBTAINING APPARATUS

CROSS REFERENCE TO RELATED APPLICATIONS

This application is a divisional of U.S. patent application Ser. No. 10/819,264, filed Apr. 7, 2004, which claims foreign priority benefit to Japanese Application No. 2003-386752 filed Nov. 17, 2003, both of which are incorporated herein by reference in its entirety.

BACKGROUND OF THE INVENTION

1. Field of the Invention

The present invention relates to an apparatus that obtains biometric information, such as a fingerprint, palm print, blood vessel arrangement, and so on, for user authentication. More precisely, the invention relates to a biometric information obtaining apparatus with a sweep-type fingerprint sensor, which apparatus obtains a series of partial images (fingerprint images) of a finger while it is moving with respect to the sensor surface (image-obtaining surface).

2. Description of the Related Art

With recent improvements in performance of compact information equipment, such as mobile phones and PDAs (Personal Digital Assistants), such equipment has increasingly been used to access communication networks and to store great amounts of user information therein, so that the need for improving the security performance of the equipment has been strongly emphasized.

For attaining a high level of security of such equipment, it is conceivable to employ a previous user authentication system that uses a password and an ID (Identification) having been commonly used. However, because of the problem that passwords and ID cards are susceptible to theft, a user authentication (verifying a current user of equipment as a previously registered user) system with higher security has been desired. To meet this demand, user authentication by human body part characteristics (biometric information) is considered a good method with high security, and in particular, fingerprint verification is advantageous in user convenience.

For fingerprint verification, an electrostatic fingerprint sensor or an optical fingerprint sensor is used to obtain a fingerprint (a pattern made of ridges that contact with the sensor surface and ditches that do not contact therewith) from a fingertip of a user who is to be identified. From a foreground image (for example, an image of ridges) of the fingerprint, its minutiae information (for example, information of branch points and end points of ridges) is extracted to be compared with registration minutia information that is previously obtained and registered as reference information for verification. In this manner, a user is identified, that is, user authentication is performed.

Generally speaking, a common type of fingerprint sensor (hereinafter sometimes called a flat type fingerprint sensor) for obtaining a fingerprint image from a user to be identified, is normally equipped with a sensor surface (image-obtaining surface) larger than the size of a human fingertip. Recently, however, for the purpose of introducing a fingerprint sensor in compact information equipment, such as a mobile phone or a PDA, the sensor surface is down-sized to be smaller than a human fingertip, and a sequence of partial images of a fingerprint are obtained through the sensor surface and then combined to regenerate the whole image of the fingerprint.

A sweep-type fingerprint sensor is one of the fingerprint sensors ready for such a recent situation (for example, refer to the following patent applications 1 and 2). The sweep-type fingerprint sensor has a small-sized rectangular image-obtaining surface (sensor surface/image capture surface) having a length sufficiently shorter than that of a human fingertip. While a finger is moving with respect to the image-obtaining surface or while the image-obtaining surface (fingerprint sensor) is moving with respect to the finger, the fingerprint sensor obtains a series of partial images of the fingerprint, based on which the whole image thereof is then reconstructed. From the thus-reconstructed fingerprint image, information of fingerprint minutiae (branch points and end points of ridges) is extracted/generated, and on the basis of the information, user authentication is performed. Here, note that such a relative movement between a finger and an image-obtaining surface is called a "sweep."

Such a sweep-type fingerprint sensor has a problem of deteriorating verification performance, which is more frequent in this type of sensor than in a flat type sensor, because finger movement with respect to the sensor surface can distort the surface skin of the finger or reduce the area of a fingerprint image obtained. Accordingly, most of the users need to learn and practice how to move their fingers, resulting in lowered user convenience in comparison with a flat type fingerprint sensor. In order to learn appropriate finger movement, it is essential for a user to be aware of his finger's current movement.

Both of the techniques disclosed in the following patent applications 1 and 2, however, delete information about finger movement, without offering a user any of the information. They show only a reconstructed image of a finger after the finger finishes with its movement or a verification result alone. Therefore, if failure in reconstruction of a fingerprint image or in fingerprint verification is caused by inappropriate finger movement, a user is not notified about the cause of the failure.

In the meantime, the following patent applications 3 and 4, for example, disclose techniques of guiding a user to put his finger at a correct position on a flat type fingerprint sensor. These techniques aim at detecting a positional relationship between the center of a sensor and a finger so as to lead the finger into the sensor center. Therefore, even if these techniques are applied to a sweep-type fingerprint sensor, it is still impossible to detect what causes distortion of a fingerprint image, so that a user still cannot recognize the fact that the distorted fingerprint image (that is, failure in fingerprint image reconstruction and in fingerprint verification) results from his erroneous finger movement. A flat type fingerprint sensor obtains such a fingerprint image as is shown in FIG. 32B, under a condition where a finger 101 is laid still on a sensor surface (image-obtaining surface) 100 as shown in FIG. 32A. Accordingly, the flat type sensor needs an instruction as to where a finger 101 should be placed with respect to the sensor surface 100, but has no need at all for real-time display/instruction of movement of a finger 101.

[Patent application 1] Japanese Patent Application Laid-open No. HEI 10-091769

[Patent application 2] Japanese Patent Application Laid-open No. HEI 11-253428

[Patent application 3] Japanese Patent Application Laid-open No. 2002-288643

[Patent application 4] Japanese Patent Application Laid-open No. 2002-177623

Against the background of the above patent applications 1-4, a technique has been desired whereby a user of a sweep-type fingerprint sensor can recognize inappropriate finger movement which causes distorted fingerprint images (that is, failure in fingerprint image reconstruction and in fingerprint verification).

SUMMARY OF THE INVENTION

With the foregoing problems in view, one object of the present invention is enabling a user of a sweep-type fingerprint sensor to recognize the way he is moving his finger so as to easily and surely learn an appropriate way he should move his finger, for attaining improvement in verification performance and user convenience.

In order to accomplish the above objects, according to the present invention, there is provided a biometric information obtaining apparatus that comprises: a biometric information obtaining means for reading a living individual's body part during a relative movement between the body part and the biometric information obtaining means, and for obtaining a series of partial images of the body part as biometric information; a velocity detecting means for detecting a movement velocity at which the body part moves with respect to the biometric information obtaining means; an image generating means for generating an arbitrary pattern, of which a portion corresponding to a position where the body part locates at the movement velocity detection performed is altered according to the movement velocity detected by the velocity detecting means; and a display for showing thereon the arbitrary pattern generated by the image generating means.

As another generic feature, there is provided a biometric information obtaining apparatus that comprises: a biometric information obtaining means for reading a living individual's body part during a relative movement between the body part and the biometric information obtaining means, and for obtaining a series of partial images of the body part as biometric information; a velocity detecting means for detecting a movement velocity at which the body part moves in relation to the biometric information obtaining means; an evaluating means for evaluating whether or not the movement velocity, which is detected by the velocity detecting means, is within a permissible range, which depends on a property of the biometric information obtaining means; and a notifying means for notifying, if the above evaluation result of the evaluating means is negative (that is, if the detected movement velocity is out of the above permissible range), about the negative evaluation result.

As one preferred feature, the biometric information obtaining apparatus further comprises a movement amount detecting means for detecting, based on a relative positional relationship between two partial images successively obtained by the biometric information obtaining means, an amount of movement of the body part for a time interval at which such partial image is obtained by the biometric information obtaining means. The velocity detecting means calculates the movement velocity based on the movement amount of the body part detected by the movement amount detecting means and the time interval at which such partial image obtaining is performed.

As another preferred feature, if the movement amount detected by the movement amount detecting means is within a range of detection errors, the movement amount detecting means holds a former one of the two partial images, which are used in detecting the movement amount, as a reference image, and newly detects such movement amount of the body part based on a relative positional relationship between the reference image and another partial image obtained subsequently to a later one of the two partial images.

As still another preferred feature, the biometric information obtaining apparatus further comprises a position detecting means for detecting a positional change of the body part by accumulating such movement amounts detected by the movement amount detecting means. At this time, the apparatus further comprises: a sideways deviation detecting means for detecting a sideways deviation of the body part based on the absolute value of the positional change, detected by the position detecting means, in a direction perpendicular to a main movement direction in which the body part is expected to move with respect to the biometric information obtaining means; and a notifying means for notifying, if such sideways deviation is detected by the sideways deviation detecting means, about the detection result. In addition, the apparatus further comprises: a serpentine movement detecting means for detecting serpentine movement based on the followings: the absolute value of the positional change, detected by the position detecting means, in a direction perpendicular to a main movement direction along which the body part is expected to move with respect to the biometric information obtaining means; and the number of times the body part reverses its movement direction along the perpendicular direction; and a notifying means for notifying, if such serpentine movement is detected by the serpentine movement detecting means, about the detection result.

As a further preferred feature, the biometric information obtaining apparatus further comprises: a movement direction variation detecting means for detecting, based on a relative positional relationship between two partial images successively obtained by the biometric information obtaining means, a movement direction variation of the body part for a time interval at which such partial image is obtained by the biometric information obtaining means; and a direction detecting means for detecting a movement direction change of the body part by accumulating such movement direction variations of the body part detected by the directional change amount detecting means. At this time, if the movement direction variation detected by the movement direction variation detecting means is within a range of detection errors, the movement direction variation detecting means holds a former one of the two partial images, which have been used for detecting the movement direction variation, as a reference image, and newly detects such movement direction variation of the body part based on a relative positional relationship between the reference image and another partial image obtained subsequently to a later one of the two partial images. In addition, the biometric information obtaining apparatus further comprises: a twist detecting means for detecting, based on the movement direction change detected by the direction detecting means, twist movement of the body part as a situation where the two partial images, for use in detecting the movement velocity by the velocity detecting means, cross each other; and a notifying means for notifying, if such twist movement of the body part is detected by the notifying means, about the detection result.

The biometric information obtaining apparatus of the present invention guarantees the following advantageous results.

The velocity detecting means detects a movement velocity of the body part in relation to the biometric information obtaining means (a sweep-type fingerprint sensor, for example), and the image generating means generates an arbitrary pattern of which portions corresponding to positions where the body part locates when the movement velocity is detected are altered in position and size according to the detected movement velocity, and the arbitrary pattern is shown on the display. As a result, it is possible for a user to recognize a current movement of the body part with respect to the biometric information obtaining means simply by referring to the display, so that the user can easily and surely learn in what way the body part should be moved on the biometric information obtaining means, the verification performance of the apparatus and the convenience of users being thereby improved.

Further, the evaluating means evaluates whether or not the movement velocity, which is detected by the velocity detecting means, is within a permissible range, which depends on a property of the biometric information obtaining means, and the notifying means notifies, if the above evaluation result of the evaluating means is negative (that is, if the detected movement velocity is out of the above permissible range), about the negative evaluation result. With this notification by the notification means, a user can recognize an inappropriate motion of the body part (for example, a too quick movement such that the partial images obtained by the biometric information obtaining means do not sufficiently overlap one another, thereby making it impossible to detect the movement velocity and to reconstruct the partial image into the whole image). As a result, it is possible for the user to easily and surely learn in what way the body part should move on the biometric information obtaining means, verification performance and user convenience being thereby improved.

Furthermore, the velocity detecting means detects a movement amount of the body part for an image-obtaining time interval, based on a relative positional relationship between two partial images successively obtained from the body part, and on the basis of the detected movement amount and the image-obtaining time interval, a movement velocity of the body part can be extremely easily obtained with high accuracy.

Here, if the movement amount detected by the movement amount detecting means is within a range of detection errors, the movement amount detecting means holds the former one of the two partial images, which are used in detecting the movement amount, as a reference image, and newly detects such a movement amount of the body part based on a relative positional relationship between the reference image and another partial image obtained subsequently to the later one of the two partial images. As a result, even if movement amounts smaller than a detection error (one pixel, for example) are consecutively detected, the detection errors are surely prevented from being accumulated, so that their effects can be minimized. In addition, since the current reference image is held without being updated, a reference image updating processing can be skipped, thereby shortening processing time.

A position detecting means accumulates such movement amounts detected by the movement amount detecting means thereby extremely easily detecting a positional change of the body part with high accuracy.

If a sideways deviation of the body part is detected based on the absolute value of the positional change, detected by the position detecting means in a direction perpendicular to the main movement direction in which the body part is expected to move, a notifying means notifies about the detection result. As a result, it is possible for a user to recognize a sideway deviation, an inappropriate motion of the body part, so that the user can easily and surely learn in what way the body part should move on the biometric information obtaining means, verification performance and user convenience being thereby improved.

In addition, if a serpentine movement of the body part is detected based on the followings: the absolute value of the positional change, detected by the position detecting means, in a direction perpendicular to the main movement direction along which the body part is expected to move; and the number of times the body part reverses its movement direction along the perpendicular direction, a notifying means notifies about the detection result. As a result, it is possible for a user to recognize a serpentine movement, an inappropriate motion of the body part, so that the user can easily and surely learn in what way the body part should move on the biometric information obtaining means, verification performance and user convenience being thereby improved.

Moreover, a movement direction variation detecting means detects, based on a relative positional relationship between two partial images successively obtained from the body part, a movement direction variation of the body part for a time interval at which such partial image is obtained, and a direction detecting means accumulates such movement direction variations, thereby extremely easily detecting a movement direction change of the body part with high accuracy.

Here, if the movement direction variation detected by the movement amount detecting means is within a range of detection errors, the movement direction variation detecting means holds the former one of the two partial images, which are used in detecting the movement direction variation, as a reference image, and newly detects such a movement direction variation of the body part based on a relative positional relationship between the reference image and another partial image obtained subsequently to the later one of the two partial images. As a result, even if movement direction variations smaller than a detection error (one pixel, for example) are consecutively detected, the detection errors are surely prevented from being accumulated, so that their effects can be minimized. In addition, since the current reference image is held without being updated, a reference image updating processing can be skipped, so that processing time is shortened.

At this time, if a twist movement of the body part is detected, based on the movement direction change detected by the direction detecting means, as a situation where the two partial images, used in detecting the movement velocity by the velocity detecting means, cross each other, a notifying means notifies about the detection result. As a result, it is possible for a user to recognize a twist movement, an inappropriate motion of the body part, so that the user can easily and surely learn in what way the body part should move on the biometric information obtaining means, verification performance and user convenience being thereby improved.

Other objects and further features of the present invention will be apparent from the following detailed description when read in conjunction with the accompanying drawings.

BRIEF DESCRIPTION OF THE DRAWINGS

FIG. 1 is a block diagram showing a functional construction of a biometric information obtaining apparatus according to one preferred embodiment of the present invention;

FIG. 2A illustrates how a finger moves with respect to a sensor surface (the finger's state at T seconds elapsed after it begins to move); FIG. 2B is a picture image generated as the finger moves as illustrated in FIG. 2A;

FIG. 3A illustrates how the finger moves with respect to a sensor surface (the finger's state at T+t seconds elapsed after it begins to move); FIG. 3B is a picture image generated as the finger moves as illustrated in FIG. 3A;

FIG. 4A illustrates how a finger moves with respect to a sensor surface (the finger's state at T seconds elapsed after it begins to move); FIG. 4B is a picture image generated as the finger moves as illustrated in FIG. 4A;

FIG. 5A illustrates how the finger moves with respect to a sensor surface (the finger's state at T+t seconds elapsed after it begins to move); FIG. 5B is a picture image generated as the finger moves as illustrated in FIG. 5A;

FIG. 6A and FIG. 6B are picture images each for use, in a third example of a picture image according to the present invention, as an arbitrary picture image by which a finger's movement is indicated;

FIG. 7A and FIG. 7B are views for describing beginning part of the third example picture image shown on the display according to the present embodiment: FIG. 7A illustrates how a finger moves with respect to a sensor surface (the finger's state at T seconds elapsed after it begins to move); FIG. 7B is a picture image generated as the finger moves as illustrated in FIG. 7A;

FIG. 5A and FIG. 8B are views for describing the following part of the third example image subsequently shown on the display: FIG. 5A illustrates how the finger moves with respect to a sensor surface (the finger's state at T+t seconds elapsed after it begins to move); FIG. 5B is a picture image generated as the finger moves as illustrated in FIG. 5A;

FIG. 9 is a picture image for use, in a fourth example of a picture image according to the present invention, as an arbitrary picture image by which a finger's movement is indicated;

FIG. 10A and FIG. 10B are views for describing beginning part of the fourth example picture image shown on the display according to the present embodiment: FIG. 10A illustrates how a finger moves with respect to a sensor surface (the finger's state at T seconds elapsed after it begins to move); FIG. 10B is a picture image generated as the finger moves as illustrated in FIG. 10A;

FIG. 11A and FIG. 11B are views for describing the following part of the fourth example image subsequently shown on the display: FIG. 11A illustrates how the finger moves with respect to a sensor surface (the finger's state at T+t seconds elapsed after it begins to move); FIG. 11B is a picture image generated as the finger moves as illustrated in FIG. 11A;

FIG. 12A illustrates how a finger moves with respect to a sensor surface (the finger's state at T seconds elapsed after it begins to move); FIG. 12B is a picture image generated as the finger moves as illustrated in FIG. 12A;

FIG. 13A illustrates how the finger moves with respect to a sensor surface (the finger's state at T+t seconds elapsed after it begins to move); FIG. 13B is a picture image generated as the finger moves as illustrated in FIG. 13A;

FIG. 14A illustrates how a finger moves with respect to a sensor surface (the finger's state at T seconds elapsed after it begins to move); FIG. 14B is a picture image generated as the finger moves as illustrated in FIG. 14A;

FIG. 15A illustrates how the finger moves with respect to a sensor surface (the finger's state at T+t seconds elapsed after it begins to move); FIG. 15B is a picture image generated as the finger moves as illustrated in FIG. 15A;

FIG. 16A illustrates how a finger moves with respect to a sensor surface (the finger's state at T seconds elapsed after it begins to move); FIG. 16B is a picture image generated as the finger moves as illustrated in FIG. 16A;

FIG. 17A illustrates how the finger moves with respect to a sensor surface (the finger's state at T+t seconds elapsed after it begins to move); FIG. 17B is a picture image generated as the finger moves as illustrated in FIG. 17A;

FIG. 18A illustrates how a finger moves with respect to a sensor surface (the finger's state at T seconds elapsed after it begins to move); FIG. 18B is a picture image generated as the finger moves as illustrated in FIG. 18A;

FIG. 19A illustrates how the finger moves with respect to a sensor surface (the finger's state at T+t seconds elapsed after it begins to move); FIG. 19B is a picture image generated as the finger moves as illustrated in FIG. 19A;

FIG. 25A through FIG. 25C are views for describing detection error absorption performed by a movement amount detecting means according to the present embodiment;

DESCRIPTION OF THE PREFERRED EMBODIMENT(S)

Figures 2A, 2B:
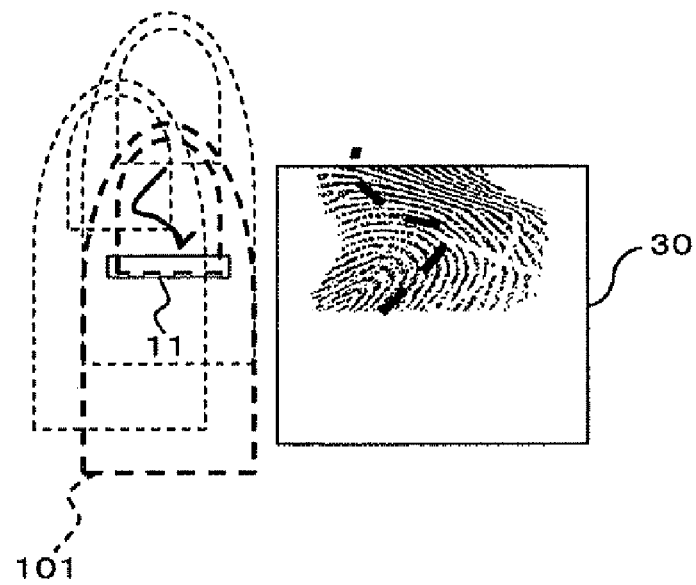
FIG. 2A and FIG. 2B are views for describing beginning part of a first example of a picture image shown on a display of the apparatus according to the present embodiment.

One preferred embodiment of the present invention is described hereinbelow with reference to the relevant accompanying drawings.

[1] Construction of a Biometric Information Obtaining Apparatus of One Preferred Embodiment:

FIG. 1 is a block diagram depicting a functional construction of a biometric information obtaining apparatus according to one preferred embodiment of the present invention. As shown in FIG. 1, the biometric information obtaining apparatus is realized, for example, by a personal computer (PC) main frame 20 equipped with a sweep-type fingerprint sensor 10 and a display 30.

Here, the sweep-type fingerprint sensor (biometric information obtaining means) 10 reads a fingerprint from a finger (body part; see reference character 101 in FIG. 2 through FIG. 5), while the finger 101 is moving relative to the sensor 10, to obtain the data thereof. The sweep-type fingerprint sensor 10 successively obtains a series of partial images of the fingerprint of the finger 101 as biometric information. As has already been described, this sweep-type fingerprint sensor 10 has a small-sized rectangular sensor surface (image obtaining surface; see reference character 11 in FIG. 2 through FIG. 5) whose length is sufficiently shorter than that of the finger 101. The fingerprint sensor 10 successively obtains partial images of the finger 101 while it is moving with respect to the sensor surface 11 or while the sensor surface 11 (fingerprint sensor 10) is moving with respect to the finger 101. The PC main frame 20 reconstructs an entire image of the finger 101 from the partial images and then extracts therefrom minutiae (branching and endpoints of fingerprint ridges) of the fingerprint. Alternatively, the PC main frame 20 extracts the minutiae from the partial fingerprint images without reconstructing such an entire image. The thus extracted fingerprint information is utilized for user authentication.

Here, when the present apparatus is applied in user authentication, the fingerprint sensor 10 obtains a series of partial images of a user's fingerprint at the time user registration and user verification are performed. In the former case, the fingerprint is obtained, as registration biometric information, from a user's finger 101 who is previously registered as a registered user; in the latter case, a fingerprint is obtained, as verification biometric information, from a user who is to be verified at the user authentication. The thus-obtained registration biometric information and verification biometric information are compared with each other for identifying the user. In addition, when the present apparatus is used to learn how a finger 101 should slide on a sweep-type fingerprint sensor 10, the fingerprint sensor 10 obtains a series of partial images of a fingerprint from a learner's finger 101.

The display 30 has, for example, an LCD (Liquid Crystal Display) or a CRT (Cathode Ray Tube) to display various types of information thereon. In the present embodiment, the display 30 serves as a display means for showing thereon images (arbitrary patterns) generated by an image generating means 206 (described later).

The PC main frame 20 functions as a movement amount detecting means 201, velocity detecting means 202, position detecting means 203, movement direction variation detecting means 204, direction detecting means 205, image generating means 206, evaluating means 207, sideways deviation detecting means 208, serpentine movement detecting means 209, twist detecting means 210, and notifying means 211, thereby realizing functions of a biometric information obtaining apparatus of the present invention. These functions are realized by a CPU (Central Processing Unit) forming the PC main frame 20.

The movement amount detecting means 201 detects an amount of movement (positional change amount) of the finger 101 in two directions (the x- and y-directions) for a time interval $\Delta t$ which the fingerprint sensor 10 obtains the partial images, based on a relative positional relationship between two partial images successively obtained by the fingerprint sensor 10. Note that the y-direction is a main movement direction (the direction in which a shorter side of a rectangular sensor surface 11 extends) in which a user is expected to move his finger 101 with respect to the fingerprint sensor 10, and also, note that the x-direction is a direction perpendicular to the main movement direction (that is, the direction in which a longer side of the rectangular sensor surface 11 extends).

Further, the movement amount detecting means 201 of the present embodiment also has a function of absorbing detection errors. If the movement amount detected by the movement amount detecting means 201 is within a predetermined range of detection errors, the movement amount detecting means 201 holds the former one of the two partial images that are used for detecting the movement amount, as a reference image, without performing updating thereon, and repeats the movement amount detection between the reference image and an individual image newly obtained, until the movement amount therebetween exceeds the predetermined range of detection errors. In other words, no updating is performed on the one of the two partial images which serves as a reference image, as long as the detected movement amount stays within the predetermined range of detection errors. As a result, detection errors of the movement amount are successfully absorbed, as will be detailed later referring to FIG. 20 and FIG. 22 through FIG. 25.

The velocity detecting means 202 detects a movement velocity at which the finger 101 moves with respect to the fingerprint sensor 10, by computation thereof based on a movement amount of the finger 101 detected by the movement amount detecting means 201 and an image obtaining time interval $\Delta t$.

The position detecting means 203 accumulates such movement amounts of the finger 101, detected by the movement amount detecting means 201, in the x-direction and the y-direction separately; that is, every time the movement amount detecting means 201 detects a movement amount (positional change amount) of the finger 101, the position detecting means 203 calculates a sum of the amounts of movement made so far by the finger 101 in the x-direction and the y-direction separately, thereby detecting a positional change (a position of the finger 101 in relation to the start point from which the finger 101 starts to move) of the finger 101 in both directions.

The movement direction variation detecting means 204 detects a movement direction variation (angular displacement) of the finger 101 for a time interval $\Delta t$ at which the fingerprint sensor 10 obtains the partial images, based on a relative positional relationship between two partial images successively obtained by the fingerprint sensor 10.

In addition, like the movement amount detecting means 201, the movement direction variation detecting means 204 has a function of absorbing detection errors. If the movement direction variation detected by the movement direction variation detecting means 204 is within a predetermined range of detection errors, the movement direction variation detecting means 204 holds the former one of the two partial images that are used for detecting the movement direction variation, as a reference image, without performing updating thereon, and repeats the movement direction variation detection between the reference image and an individual image newly obtained, until the movement amount therebetween exceeds the predetermined range of detection errors. In other words, no updating is performed on the one of the two partial images which serves as a reference image, as long as the detected movement direction variation stays within the predetermined range of detection errors. As a result, detection errors of the movement direction variation are successfully absorbed.

In the present embodiment, detection of a movement direction variation of the finger 101 by the movement direction variation detecting means 204 is performed after detection of a movement amount of the finger 101 by the movement amount detecting means 201. More specifically, as will be described later referring to FIG. 21, FIG. 26, and FIG. 27, the movement amount detecting means 201 detects a movement amount before the movement direction variation detecting means 204 detects a movement direction variation (angular displacement) at a position (area) where the two partial images overlap each other.

The direction detecting means 205 accumulates such movement direction variations of the finger 101, detected by the movement direction variation detecting means 2047 that is, every time the movement direction variation detecting means 204 detects a movement direction variation (angular displacement) of the finger 101, the direction detecting means 205 calculates a sum of the movement direction variations detected so far, thereby detecting a movement direction change (an angle of the finger 101 with respect to the direction in which the finger 101 moves when it starts to move).

The image generating means 206 generates an arbitrary pattern, of which a portion corresponding to a position at which the finger 101 (fingerprint) locates when the movement velocity is detected is changed in position and size in accordance with the detected movement velocities. The thus generated arbitrary pattern is then shown on the display 30. At that time, if the velocity detecting means 202 detects a movement velocity (the movement velocity in the main movement direction, or the y-direction) exceeding the velocity detection errors of the velocity detecting means 202, the image generating means 206 updates the aforementioned arbitrary pattern in such a manner that the portion corresponding to a position at which the finger 101 (fingerprint) locates when the above velocity is detected, is changed in position and size. Exemplary picture images generated, as an arbitrary pattern, on the display 30 by the image generating means 206 will be detailed later referring to FIG. 2 through FIG. 19.

The evaluating means 207 evaluates whether or not the velocity in the y-direction detected by the velocity detecting means 202 is within a range of allowable velocities whose maximum and minimum limits are determined (in such a manner as will be described later) based on properties of the fingerprint sensor 10 (that is, it is evaluated whether or not the velocity exceeds the maximum limit of the range, or whether or not the velocity is less than the minimum limit).

Hereinbelow, the maximum limit of a movement velocity according to the present embodiment will be described referring to FIG. 30A through FIG. 30C.

At detecting an amount of movement made by the finger 101 during an image obtaining time interval $\Delta t$, the movement amount detecting means 201 needs to detect a relative positional relationship between two partial images obtained from the finger 101. This relative positional relationship is detected by superposing one of the partial images on the other in such a manner that image overlap areas, whose picture images are identical with each other, of the two partial images coincide. Here, such image overlap areas need to have a certain amount of size to realize this superposing. $\delta_{min}$ is a minimum of the size (length) in the y-direction of an image overlap area required to realize the superposing (or required to detect a movement velocity by the velocity detecting means 202).

Figure 30A:
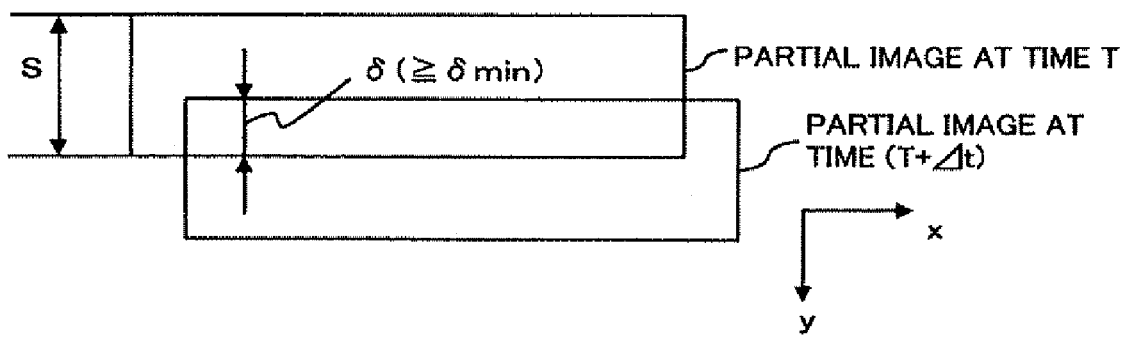
FIG. 30A through FIG. 30C are views for describing the maximum of movement velocity allowed according to the present embodiment.
Figure 30B:
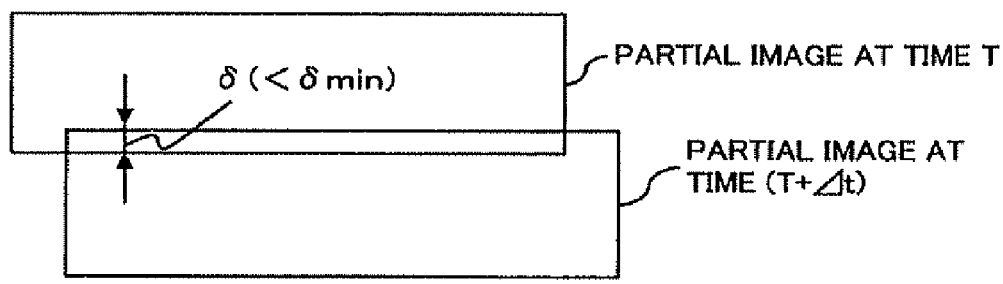
Figure 30C:
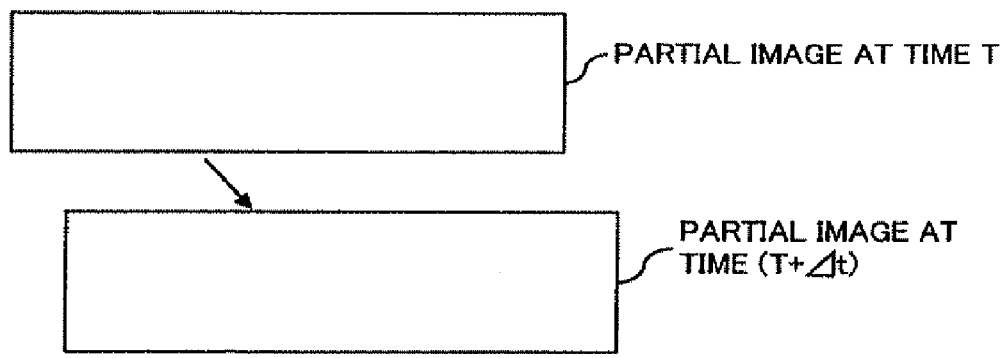

For example, as shown in FIG. 30A, if the size (length) $\delta$ in the y-direction of the image overlap areas of the two partial images is equal to the minimum overlap size $\delta_{min}$ or larger, the image overlap areas are large enough to overlap image information thereof so that a relative positional relationship between the two partial images can be detected with reliability. On the other hand, if the overlap size $\delta$ in the y-direction drops below the minimum overlap size $\delta_{min}$ because the finger 101 moves too fast (see FIG. 30B), or if there is no overlap area between the two partial images (see FIG. 30C), it is impossible to overlap image information of image overlap areas of the two partial images, thereby making it also impossible to detect a relative positional relationship between the two partial images, so that movement velocity of the finger 101 cannot be detected.

Accordingly, the maximum limit of the movement velocity of the finger 101 is given by $$((S-\delta_{min})/\Delta t)*R/(((S-\delta_{min})/\Delta t)+R)$$

based on the following properties of the fingerprint sensor 10: the size S (the length in the y-direction) of partial images obtained by the fingerprint sensor 10; the aforementioned minimum overlap size $\delta_{min}$; a time interval $\Delta t$ which the fingerprint sensor 10 obtains the partial images; a velocity R at which the fingerprint sensor 10 reads image information in the y-direction. Here, if the reading velocity R is sufficiently larger than $(S-\delta_{min})/\Delta t$, the maximum limit can be given also by $(S-\delta_{min})/\Delta t$.

In the meantime, provided the finger 101 suddenly turns its direction, or provided the finger 101 repeatedly stops traveling, or provided the finger 101 moves too slowly to absorb detection errors of the movement amount, the evaluating means 207 detects such states of the finger 101 when the movement velocity in the y-direction detected by the velocity detecting means 202 drops below the minimum limit. If it is detected that the finger 101 is in such a state, the notifying means 211 instructs the user to move his finger 101 faster in a certain direction (y-direction). At this time, the minimum limit of the movement velocity is given, for example, as a velocity (that is, a velocity of $d/\Delta t$) at which a movement amount of the finger 101 for an image-obtaining time interval $\Delta t$ falls below a detection error (d, for example), which will be detailed later, or as a velocity revealed when the sign of the movement velocity is inverted (that is, a velocity of 0).

The sideways deviation detecting means 208 detects a sideways deviation of the finger 101, based on the absolute value of a positional change (the finger 101's position in the x-direction in relation to the movement start point) in the x-direction (the direction which extends along a longer side of the fingerprint sensor 10) detected by the position detecting means 203. This sideways deviation detecting means 208 compares the absolute value of the positional change in the x-direction with a predetermined threshold that is determined based on an average width of finger 101. If the absolute value of the positional change exceeds the predetermined threshold, the sideways deviation detecting means 208 detects an occurrence of sideways deviation of the finger 101.

The serpentine movement detecting means 209 detects serpentine movement of the finger 101, based on the absolute value of a positional change (the finger lolls position in the x-direction in relation to the movement start point) in the x-direction (the direction which extends along a longer side of the fingerprint sensor 10) detected by the position detecting means 203, and on the number of times the finger 101 reverses its movement direction along the x-direction. The serpentine movement detecting means 209 compares the absolute value of the positional change in the x-direction with a predetermined threshold that is determined based on an average width of finger 101, and it also compares the number of times the finger 101 reverses its movement direction along the x-direction with a predetermined value. If it is found that the finger 101 moves out of a predetermined width range and reverses its movement direction a greater number of times than is predetermined, the serpentine movement detecting means 209 detects an occurrence of serpentine movement of the finger 101.

Figure 31:
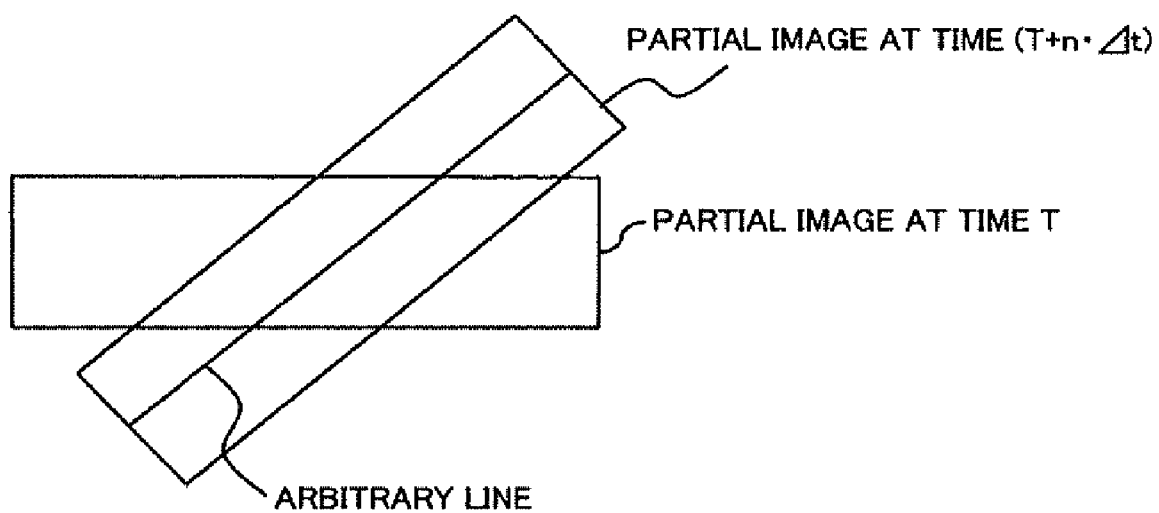
FIG. 31 is a view for describing twist detection performed according to the present embodiment.
Figure 32A:
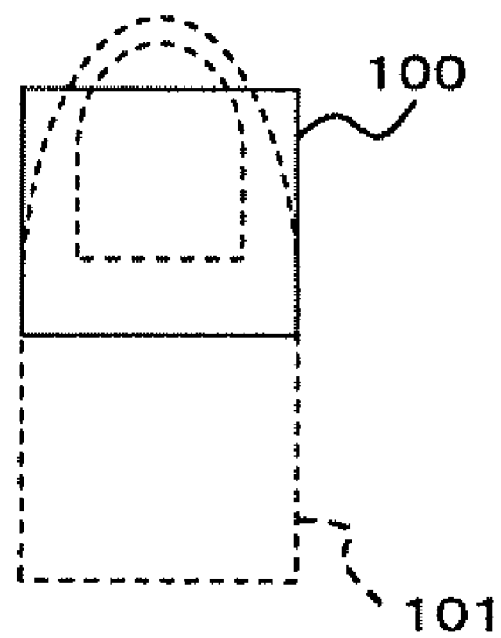
FIG. 32A is a view for describing how a finger should be laid on the sensor surface of a flat type fingerprint sensor.
Figure 32B:
FIG. 32B is an example of a fingerprint image obtained by the flat type fingerprint sensor.

The twist detecting means 210 detects twist movement of the finger 101 as a state where two partial images, for use in detecting a movement velocity by the velocity detecting means 202, cross each other, based on a movement direction change (an angle formed between the finger 101 and the movement direction when the finger 101 starts to move) detected by the direction detecting means 205. If an arbitrary line extending in the x-direction in one of the two partial images crosses the remaining one, as shown in FIG. 31, the twist detecting means 210 detects an occurrence of twist movement of the finger 101.

The notifying means 211 notifies a user of the following respective detection results if:

(11) the evaluating means 207 detects that the movement velocity exceeds the aforementioned maximum limit, or that the velocity is smaller than the aforementioned minimum limit (out of the foregoing permissible range);

(12) the sideways deviation detecting means 208 detects sideways deviation of the finger 101;

(13) the serpentine movement detecting means 209 detects serpentine movement of the finger 101; and

(14) the twist detecting means 210 detects twist movement of the finger 101.

At that time, the notifying means 211 can use picture images generated by the image generating means 206 so as to show the above states (11) through (14) on the display 30, or alternatively, beeps sounded by means of a speaker or the like.

[2] Operation of the Biometric Information Obtaining Apparatus According to the Present Embodiment:

An operation of a biometric information obtaining apparatus with such a construction as has been described above will be described hereinbelow referring to FIG. 2 through FIG. 29.

[2-1] Image Generation Function of the Present Embodiment:

In a biometric information obtaining apparatus according to the present embodiment, the image generating means 206 generates an arbitrary pattern, of which a portion corresponding to a position where a finger 101 (fingerprint) is located when a movement velocity is detected, is changed in position and size in accordance with the detected movement velocities, and the generated arbitrary pattern is shown on the display 30. As a result, it is possible to show a movement of the finger 101 with respect to a fingerprint sensor 10 in real time, so as to instruct a user how he should move his finger 101 on the sensor surface. In other words, after detecting the movement (velocity, positional change, directional change, and so on) of the finger 101, operations for image generation and display are carried out in real time.

Referring to FIG. 2 through FIG. 19, a description will be made hereinbelow of an example picture image (arbitrary pattern) generated by the image generating means 206 on the display 30.

Figures 3A, 3B:
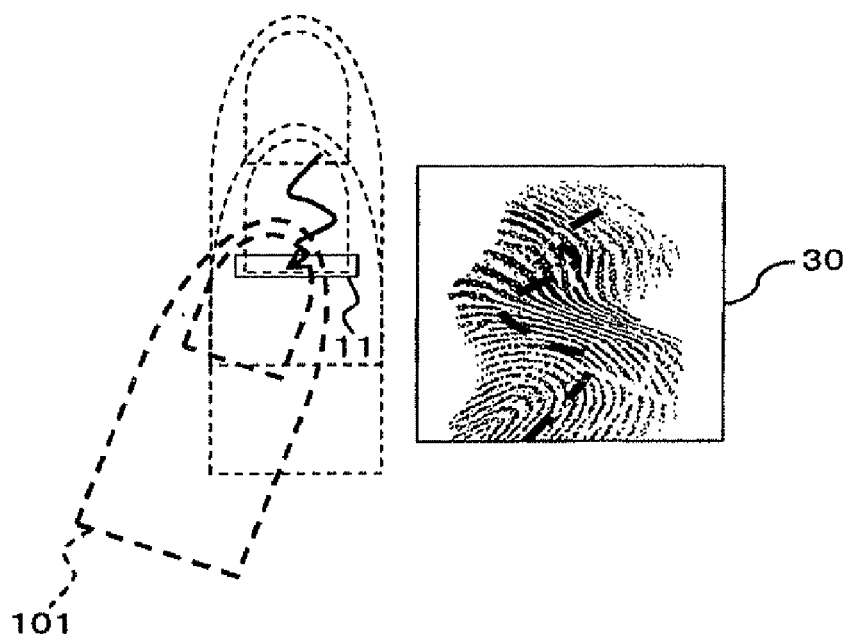
FIG. 3A and FIG. 3B are views for describing the following part of the first example image subsequently shown on the display.

[2-1-1] Example Image 1:

FIG. 2A, FIG. 2B, FIG. 3A, and FIG. 3B are views for describing a first example of a picture image generated in the present embodiment. FIG. 2A illustrates a movement of the finger 101 with respect to the sensor surface 11 (the finger 101's state at T seconds elapsed after it begins to move); FIG. 2B shows a picture image generated on the display 30 as the finger 101 moves as illustrated in FIG. 2A; FIG. 3A illustrates a movement of the finger 101 with respect to the sensor surface 11 (the finger 101's state at T+t seconds elapsed after it begins to move); and FIG. 3B shows a picture image generated on the display 30 as the finger 101 moves as illustrated in FIG. 3A.

In the first example, as illustrated in FIG. 2B and FIG. 3B, a fingerprint image, a composite image made up of partial images obtained by the fingerprint sensor 10, is used as an arbitrary pattern. Here, note that the thick broken lines indicating a path on which the finger 101 travels will not be shown on the display 30 in practical applications.

If the finger 101 moves along the path indicated with the solid arrow in FIG. 2A for T seconds after it starts to move with respect to the rectangular sensor surface 11, on the display 30 there is shown a fingerprint image (see FIG. 2B) having been obtained and combined by the time point T (seconds), as it is, without any amendment performed thereon according to the movement velocity. After that, if the finger 101 travels on the path indicated with the solid arrow in FIG. 3A, on the display 30 there is shown a fingerprint image (see FIG. 3B) having been obtained and combined by the time point T+t (seconds), as it is, without any amendment performed thereon according to the movement velocity.

Figures 4A, 4B:
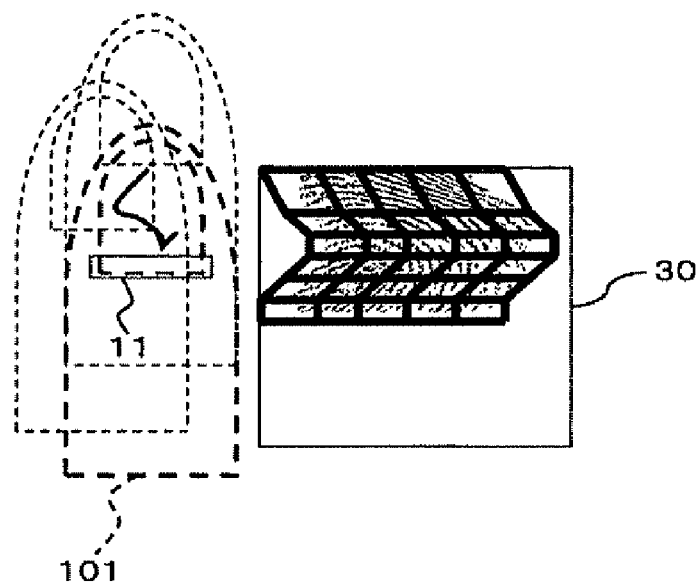
FIG. 4A and FIG. 4B are views for describing beginning part of a second example of a picture image shown on the display according to the present embodiment.
Figures 5A, 5B:
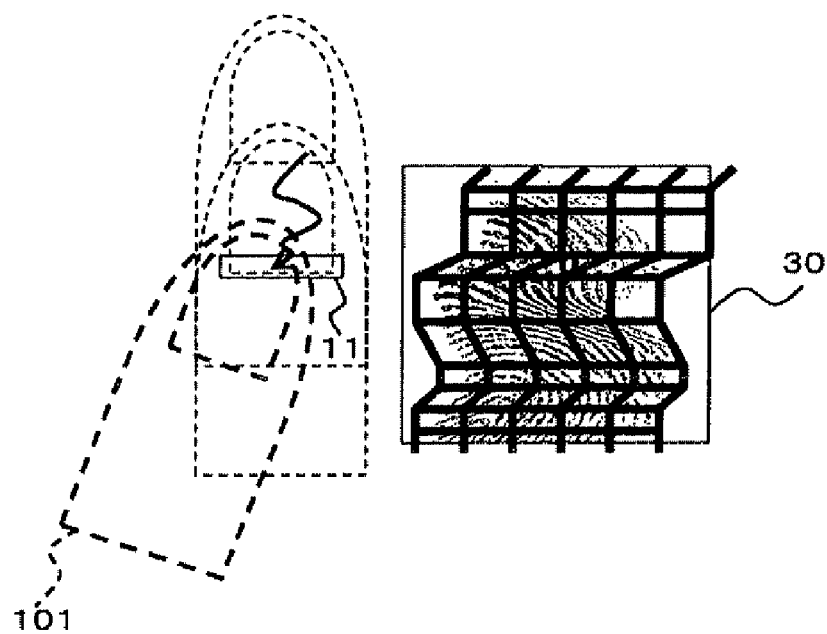
FIG. 5A and FIG. 5B are views for describing the following part of the second example image subsequently shown on the display.

[2-1-2] Example Image 2:

FIG. 4A, FIG. 4B, FIG. 5A, and FIG. 5B are views for describing a second example of a picture image generated in the present embodiment. FIG. 4A illustrates a movement of the finger 101 with respect to the sensor surface 11 (the finger 101's state at T seconds elapsed after it begins to move); FIG. 4B shows a picture image generated on the display 30 as the finger 101 moves as illustrated in FIG. 4A; FIG. 5A illustrates a movement of the finger 101 with respect to the sensor surface 11 (the finger 101's state at T+t seconds elapsed after it begins to move); and FIG. 5B shows a picture image generated on the display 30 as the finger 101 moves as illustrated in FIG. 5A.

In the second example, as illustrated in FIG. 4B and FIG. 5B, a grid-like pattern is employed as an arbitrary pattern. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), shown on the display 30 is a grid-like pattern composed of rectangles identical in size and shape. Here, note that the thick broken lines indicating a path on which the finger 101 travels will not be shown on the display 30 in practical applications.

If the finger 101 moves along the path indicated with the solid arrow in FIG. 4A for T seconds after it starts to move with respect to the sensor surface 11, on the display 30 is shown a grid-like pattern, as shown in FIG. 4B, of which portions corresponding to positions where the finger 101 (fingerprint) locates when movement velocity detection is performed are altered in position and size according to movement velocities having been detected by the time point of T seconds elapsed. After that, if the finger 101 travels on the path indicated with the solid arrow in FIG. 5A, on the display 30 is shown a grid-like pattern of FIG. 5B, of which portions corresponding to positions where the finger 101 (fingerprint) locates when movement velocity detection is performed are altered in position and size according to movement velocities having been detected by the time point of T+t seconds elapsed.

[2-1-3] Example Image 3:

FIG. 6A and FIG. 6B show picture images (operation instruction images) each for use as an arbitrary picture image in a third example image generated in the present embodiment. FIG. 7A, FIG. 7B, FIG. 8A, and FIG. 8B are views for describing the third example of a picture image generated based on the picture image of FIG. 6A. FIG. 7A illustrates a movement of the finger 101 with respect to the sensor surface 11 (the finger 101's state at T seconds elapsed after it begins to move); FIG. 7B shows a picture image generated on the display 30 as the finger 101 moves as illustrated in FIG. 7A; FIG. 8A illustrates a movement of the finger 101 with respect to the sensor surface 11 (the finger 101's state at T+t seconds elapsed after it begins to move); and FIG. 5B shows a picture image generated on the display 30 as the finger 101 moves as illustrated in FIG. 8A.

In the third example, the arbitrary picture image (operation instruction image) as shown in FIG. 6A and FIG. 6B is displayed as an arbitrary pattern. These picture images of FIG. 6A and FIG. 6B are prepared with an intention to remind a user of an operation instruction (an ideal movement of the Finger 101): FIG. 6A is suitable for showing a direction in which the Finger 101 should travel; FIG. 6B is effective for showing the way in which the finger 101 should be laid on the sensor surface 11. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (they-direction), the operation instruction image of FIG. 6A or FIG. 6B is shown on the display 30, as it is, without any deformation or displacement thereof. Here, a description will be made, using the operation instruction image of FIG. 6A.

If the finger 101 moves along the path indicated with the solid arrow in FIG. 7A for T seconds after it starts to move with respect to the sensor surface 11, on the display 30 is shown an operation instruction image, as shown in FIG. 7B, of which portions corresponding to positions where the finger 101 (fingerprint) locates when movement velocity detection is performed are altered in position and size according to movement velocities having been detected by the time point of T seconds elapsed. After that, if the finger 101 travels on the path indicated with the solid arrow in FIG. 8A, on the display 30 is shown an operation instruction image of FIG. 8B, of which portions corresponding to positions where the finger 101 (fingerprint) locates when movement velocity detection is performed are altered in position and size according to movement velocities having been detected by the time point of T+t seconds elapsed. Here, note that the thick broken lines in FIG. 7B and FIG. 5B indicating a path on which the finger 101 travels will not be shown on the display 30 in practical applications.

[2-1-4] Example Image 4:

FIG. 9 shows a picture image (character image) for use as an arbitrary picture image in a fourth example image generated in the present embodiment. FIG. 10A, FIG. 10B, FIG. 11A, and FIG. 11B are views for describing the fourth example of a picture image generated based on the picture image of FIG. 9. FIG. 10A illustrates a movement of the finger 101 with respect to the sensor surface 11 (the finger 101's state at T seconds elapsed after it begins to move); FIG. 10B shows a picture image generated on the display 30 as the finger 101 moves as illustrated in FIG. 10A; FIG. 11A illustrates a movement of the finger 101 with respect to the sensor surface 11 (the finger 101's state at T+t seconds elapsed after it begins to move); and FIG. 11B shows a picture image generated on the display 30 as the finger 101 moves as illustrated in FIG. 11A.

In the fourth example, the arbitrary picture image (character image) as shown in FIG. 9, for example, is displayed as an arbitrary pattern. Here, the picture images of FIG. 9 are prepared to encourage a user to move his finger 101 in an ideal way. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), the character image of FIG. 9 is shown on the display 30, as it is, without any deformation or displacement thereof.

If the finger 101 moves along the path indicated with the solid arrow in FIG. 10A for T seconds after it starts to move with respect to the sensor surface 11, on the display 30 is shown a character image, as shown in FIG. 10B, of which portions corresponding to positions where the finger 101 (fingerprint) is located when movement velocity detection is performed are altered in position and size according to movement velocities having been detected by the time point of T seconds elapsed. After that, if the finger 101 travels on the path indicated with the solid arrow in FIG. 11A, on the display 30 is shown a character image of FIG. 11B, of which portions corresponding to positions where the finger 101 (fingerprint) is located when movement velocity detection is performed are altered in position and size according to movement velocities having been detected by the time point of T+t seconds elapsed. Here, note that the thick broken lines in FIG. 10B and FIG. 11B indicating a path on which the finger 101 travels will not be shown on the display 30 in practical applications.

Figures 12A, 12B:
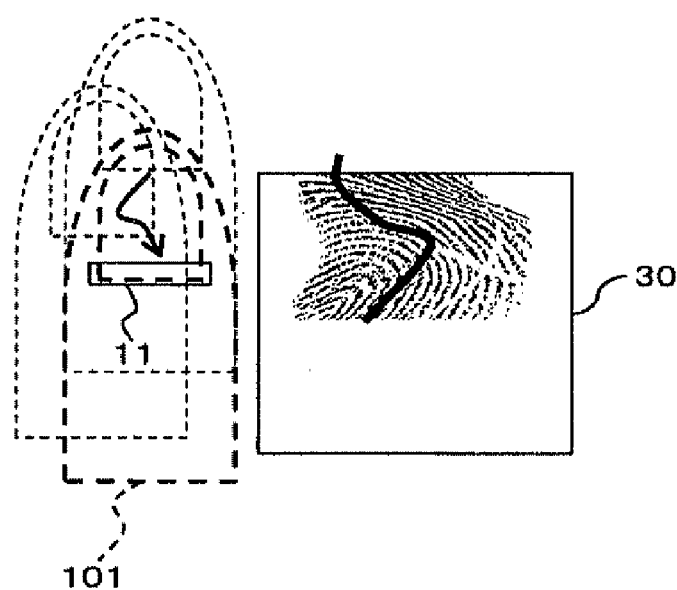
FIG. 12A and FIG. 12B are views for describing beginning part of a fifth example of a picture image shown on the display according to the present embodiment.
Figures 13A, 13B:
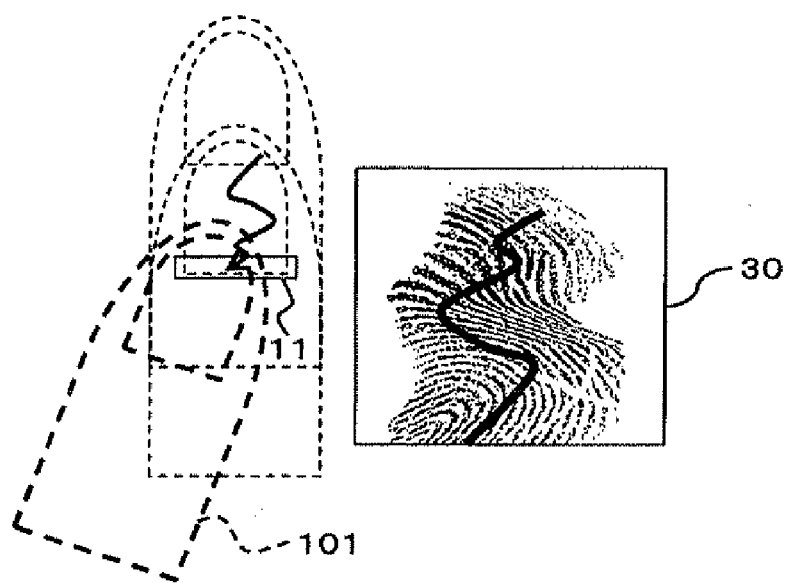
FIG. 13A and FIG. 13B are views for describing the following part of the fifth example image subsequently shown on the display.

[2-1-5] Example Image 5:

FIG. 12A, FIG. 12B, FIG. 13A, and FIG. 13B are views for describing a fifth example of a picture image generated in the present embodiment. FIG. 12A illustrates a movement of the finger 101 with respect to the sensor surface 11 (the finger 101's state at T seconds elapsed after it begins to move); FIG. 12B shows a picture image generated on the display 30 as the finger 101 moves as illustrated in FIG. 12A; FIG. 13A illustrates a movement of the finger 101 with respect to the sensor surface 11 (the finger 101's state at T+t seconds elapsed after it begins to move); and FIG. 13B shows a picture image generated on the display 30 as the finger 101 moves as illustrated in FIG. 13A.

In the fifth example, as illustrated in FIG. 12B and FIG. 13B, a movement path (a thick solid line) on which the finger 101 travels is employed as an arbitrary pattern. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), on the display 30 is shown a straight line running along the y-direction. Here, note that the obtained and combined fingerprint images shown in FIG. 12B and FIG. 13B will not be shown on the display 30 in practical applications.

If the finger 101 moves along the path indicated with the solid arrow in FIG. 12A for T seconds after it starts to move with respect to the sensor surface 11, on the display 30 is shown a movement path, as shown in FIG. 12B, generated according to movement velocities having been detected by the time point of T seconds elapsed. After that, if the finger 101 travels on the path indicated with the solid arrow in FIG. 13A, on the display 30 is shown a movement path of FIG. 13B generated according to movement velocities having been detected by the time point of T+t seconds elapsed.

Figures 14A, 14B:
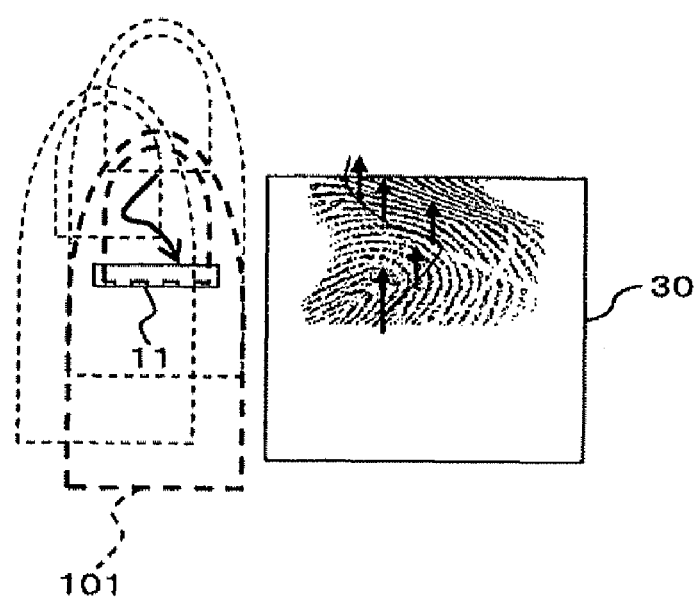
FIG. 14A and FIG. 14B are views for describing beginning part of a sixth example of a picture image shown on the display according to the present embodiment.
Figures 15A, 15B:
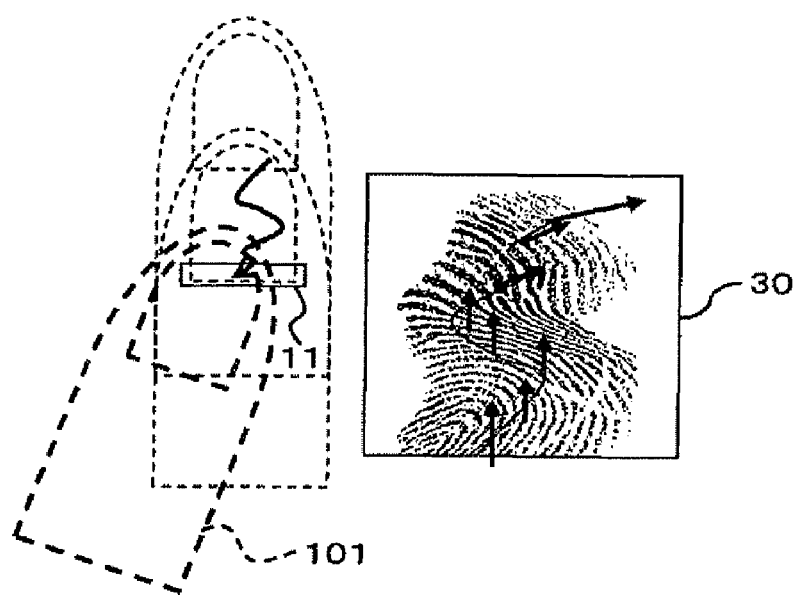
FIG. 15A and FIG. 15B are views for describing the following part of the sixth example of a picture image subsequently shown on the display.

[2-1-6] Example Image 6:

FIG. 14A, FIG. 14B, FIG. 15A, and FIG. 15B are views for describing a sixth example of a picture image generated in the present embodiment. FIG. 14A illustrates a movement of the finger 101 with respect to the sensor surface 11 (the finger 101's state at T seconds elapsed after it begins to move); FIG. 14B shows a picture image generated on the display 30 as the finger 101 moves as illustrated in FIG. 14A; FIG. 15A illustrates a movement of the finger 101 with respect to the sensor surface 11 (the finger 101's state at T+t seconds elapsed after it begins to move); and FIG. 15B shows a picture image generated on the display 30 as the finger 101 moves as illustrated in FIG. 15A.

In the sixth example, as illustrated in FIG. 14B and FIG. 15B, vectors corresponding to movement of the finger 101, or arrows (or line segments) each having a length corresponding to a movement velocity detected by the velocity detecting means 202 are employed as an arbitrary pattern. These arrows (or line segments) extend in directions (directions based on detection results of the direction detecting means 205 can be used) that correspond to movement directions in which the finger 101 moves. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), on the display 30 are shown arrows of an identical length, aligned on a single straight line that runs in the y-direction. Here, note that the obtained and combined fingerprint images shown in FIG. 14B and FIG. 15B will not be shown on the display 30 in practical applications.

If the finger 101 moves along the path indicated with the solid arrow in FIG. 14A for T seconds after it starts to move with respect to the sensor surface 11, on the display 30 are shown five arrows, as shown in FIG. 14B, which are generated according to movement velocities having been detected by the time point of T seconds elapsed and are placed at positions on the display 30 which correspond to positions where the finger 101 (fingerprint) is located when the movement velocities are detected. After that, if the finger 101 travels on the path indicated with the solid arrow in FIG. 15A, on the display 30 are shown eight arrows of FIG. 15B, which are generated according to movement velocities having been detected by the time point of T+t seconds elapsed and are placed at positions on the display 30 which correspond to positions where the finger 101 (fingerprint) is located when the movement velocities are detected.

Figures 16A, 16B:
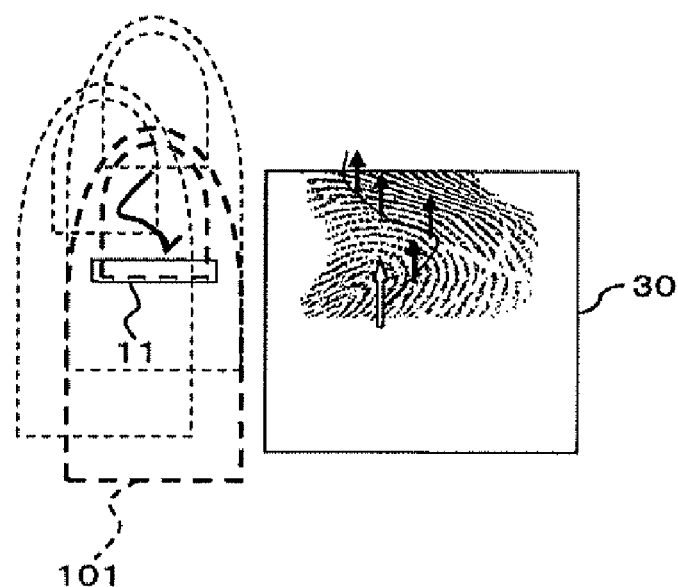
FIG. 16A and FIG. 16B are views for describing beginning part of a seventh example of a picture image shown on the display according to the present embodiment.
Figures 17A, 17B:
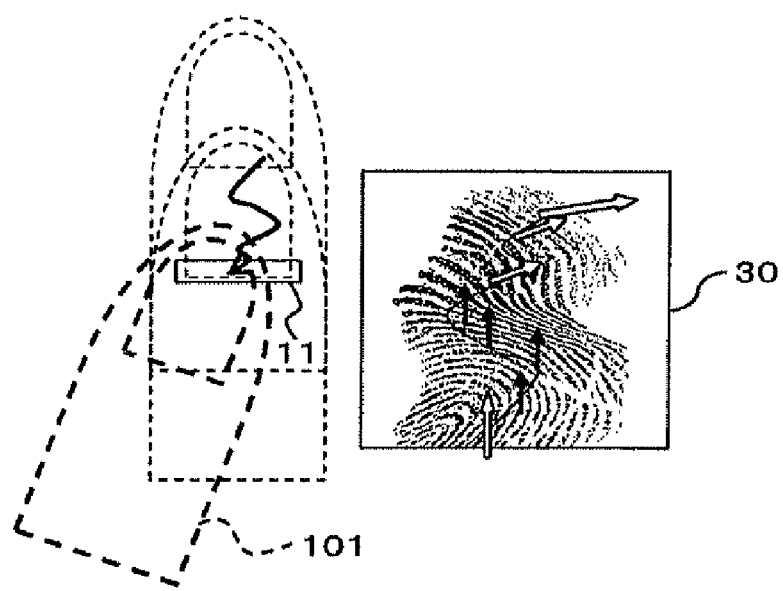
FIG. 17A and FIG. 17B are views for describing the following part of the seventh example image subsequently shown on the display.

[2-1-7] Example Image 7:

FIG. 16A, FIG. 16B, FIG. 17A, and FIG. 17B are views for describing a seventh example of a picture image generated in the present embodiment. FIG. 16A illustrates a movement of the finger 101 with respect to the sensor surface 11 (the finger 101's state at T seconds elapsed after it begins to move); FIG. 16B shows a picture image generated on the display 30 as the finger 101 moves as illustrated in FIG. 16A; FIG. 17A illustrates a movement of the finger 101 with respect to the sensor surface 11 (the finger 101's state at T+t seconds elapsed after it begins to move); and FIG. 17B shows a picture image generated on the display 30 as the finger 101 moves as illustrated in FIG. 17A.

In the seventh example, as illustrated in FIG. 16B and FIG. 17B, arrows (or line segments) each given a color (indicated as solid arrows and outlined arrows in the drawings) corresponding to a movement velocity detected by the velocity detecting means 202 are employed as an arbitrary pattern. These arrows (or line segments) extend in directions (directions based on detection results of the direction detecting means 205 can be used) that correspond to movement directions in which the finger 101 moves. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), on the display 30 are shown arrows of an identical color, aligned on a single straight line that runs in the y-direction. Here, note that the obtained and combined fingerprint images shown in FIG. 16B and FIG. 17B will not be shown on the display 30 in practical applications.

If the finger 101 moves along the path indicated with the solid arrow in FIG. 16A for T seconds after it starts to move with respect to the sensor surface 11, on the display 30 are shown five arrows, as shown in FIG. 16B, which are generated according to movement velocities having been detected by the time point of T seconds elapsed and are placed at positions on the display 30 which correspond to positions where the finger 101 (fingerprint) is located when the movement velocities are detected. After that, if the finger 101 travels on the path indicated with the solid arrow in FIG. 17A, on the display 30 are shown eight arrows of FIG. 17B, which are generated according to movement velocities having been detected by the time point of T+t seconds elapsed and are placed at positions on the display 30 which correspond to positions where the finger 101 (fingerprint) is located when the movement velocities are detected. Here, note that, in FIG. 16B and FIG. 17B, the outlined arrows indicate velocities larger than those indicted by the solid lines.

Figures 18A, 18B:
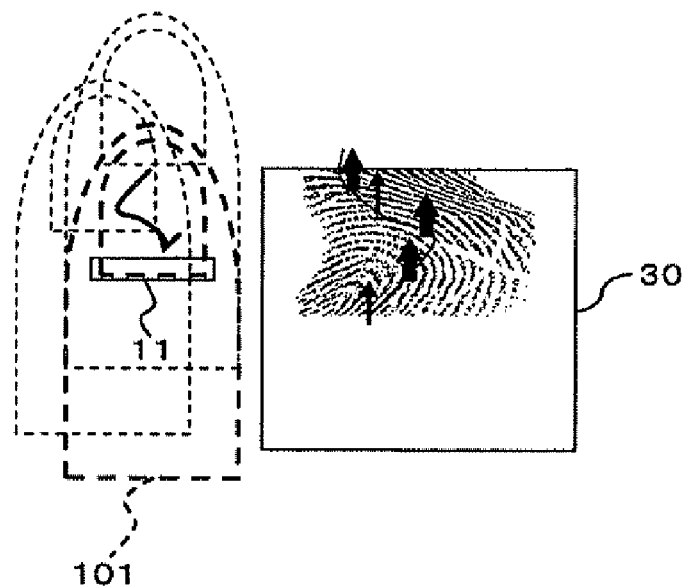
FIG. 18A and FIG. 18B are views for describing beginning part of an eighth example of a picture image shown on the display according to the present embodiment.
Figures 19A, 19B:
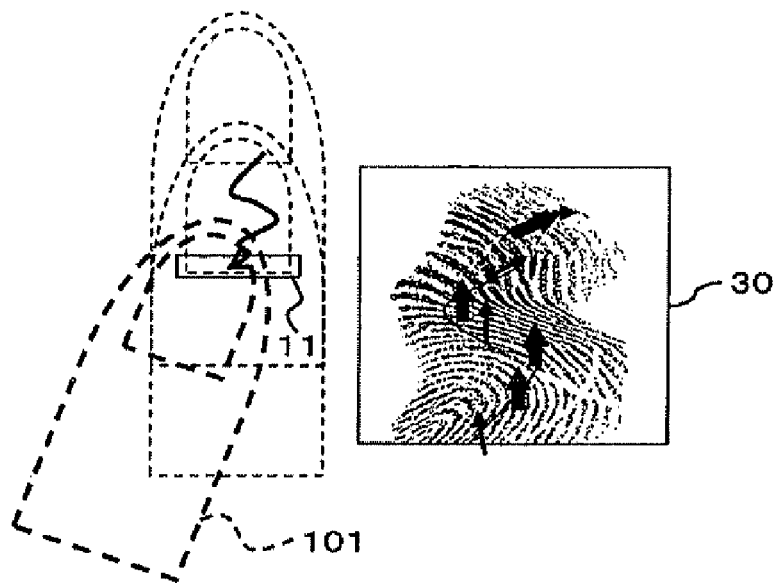
FIG. 19A and FIG. 19B are views for describing the following part of the eighth example image subsequently shown on the display.

[2-1-8] Example Image 8:

FIG. 18A, FIG. 18B, FIG. 19A, and FIG. 19B are views for describing an eighth example of a picture image generated in the present embodiment. FIG. 18A illustrates a movement of the finger 101 with respect to the sensor surface 11 (the finger 101's state at T seconds elapsed after it begins to move); FIG. 18 shows a picture image generated on the display 30 as the finger 101 moves as illustrated in FIG. 18A; FIG. 19A illustrates a movement of the finger 101 with respect to the sensor surface 11 (the finger 101's state at T+t seconds elapsed after it begins to move); and FIG. 19B shows a picture image generated on the display 30 as the finger 101 moves as illustrated in FIG. 19A.

In the eighth example, as illustrated in FIG. 18B and FIG. 19B, arrows (or line segments) each having a thickness corresponding to a movement velocity detected by the velocity detecting means 202 are employed as an arbitrary pattern. These arrows (or line segments) extend in directions (directions based on detection results of the direction detecting means 205 can be used) that correspond to movement directions in which the finger 101 moves. Assuming that the finger 101 makes an ideal movement with respect to the rectangular sensor surface 11 such that it moves at a constant speed, which is equal to or greater than the aforementioned minimum limit of the movement velocity and also equal to or smaller than the aforementioned maximum limit of the movement velocity, in a constant direction (the y-direction), on the display 30 are shown arrows of an identical thickness, aligned on a single straight line that runs in the y-direction. Here, note that the obtained and combined fingerprint images shown in FIG. 18B and FIG. 19B will not be shown on the display 30 in practical applications.

If the finger 101 moves along the path indicated with the solid arrow in FIG. 18A for T seconds after it starts to move with respect to the sensor surface 11, on the display 30 are shown five arrows, as shown in FIG. 18B, which are generated according to movement velocities having been detected by the time point of T seconds elapsed and are placed at positions on the display 30 which correspond to positions where the finger 101 (fingerprint) is located when the movement velocities are detected. After that, if the finger 101 travels on the path indicated with the solid arrow in FIG. 19A, on the display 30 are shown eight arrows of FIG. 19B, which are generated according to movement velocities having been detected by the time point of T+t seconds elapsed and are placed at positions on the display 30 which correspond to positions where the finger 101 (fingerprint) is located when the movement velocities are detected.

[2-2] Notification Function of the Present Embodiment:

In a biometric information obtaining apparatus according to the present embodiment, if it is found that a user moves his finger 101 in such a manner that verification performance of the apparatus is lowered (an inappropriate movement of the finger 101), the notifying means 211 notifies the user to that effect in real time.

As such verification-performance-lowering movement is performed by the finger 101, the following are detected:

(21) a movement velocity of the finger 101 exceeding a detection limit (a movement velocity out of the aforementioned permissible range of velocities);

(22) a significant sideways deviation of the finger 101;

(23) a significant serpentine movement of the finger 101 in a lateral direction; and

(24) a twist movement of the finger 101.

These motions (21), (22), (23), and (24) of the finger 101 are detected by the evaluating means 207, sideways deviation detecting means 208, serpentine movement detecting means 209, and twist detecting means 210, respectively. Upon detection of these motions (21) through (24), the notifying means 211 notifies the user that he is moving his finger 101 in an inappropriate way, and also in what way the movement is inappropriate (for example, the finger 101 moves too fast or too slow; it slides sideways significantly; it serpentines significantly; it shows a twisted motion). Such notification is given, for example, as a picture image shown on the display 30 together with beeps sounded by a speaker or the like.

[2-3] Movement Amount Detection and Detection Error Absorption in the Present Embodiment:

Referring now to the flowchart (step S11 through step S17) of FIG. 20, a description will be made hereinbelow on procedures of movement amount detection and detection error absorption performed by the movement amount detecting means 201. The fingerprint sensor 10 obtains the first image (a partial image) of the fingerprint of the finger 101 (step S11), which image is then set as a reference image for use in detecting an amount of movement of the finger 101 (step S12). After that, the fingerprint sensor 10 obtains the Nth (the initial value of N is 2; N=2, 3, 4, . . . ) fingerprint image (partial image) (step S13), and the Nth fingerprint image and the reference image overlap each other, thereby producing an overlap area to detect a relative positional relationship therebetween, based on which the amount of movement between the reference image and the Nth fingerprint image is then detected (step S14). After that, it is detected whether or not the detected movement amount (the amount in the y-direction in the present example) exceeds a predetermined detection error (step S15).

If the above detection result is positive (YES route of step S15), the movement amount detected at step S14 is output, as a detection result, from the movement amount detecting means 201, and the Nth fingerprint image obtained at step S13 is newly set as a reference image for use in detecting another movement amount, thereby updating the reference image (step S16). N is incremented by "1" (step S17), and the process returns to step S13.

On the other hand, if the above detection result is negative (NO route of step S15), step S16 is skipped. N is incremented by "1" (step S17), and the process returns to step S13. That is, the current reference image is held, without undergoing updating thereof, to serve as a reference image until a movement amount exceeding the above-mentioned predetermined detection error is detected at step S14. Here, the movement amount detected at step S14 is not output, as a detection result, from the movement amount detecting means 201 until a movement amount exceeding the above-mentioned predetermined detection error is detected at step S14.

Next, referring to FIG. 22 through FIG. 25, a description will be made hereinbelow of a movement amount detection error, problems caused by this error, and how the error is absorbed by means of a movement amount detecting means according to the present embodiment.

Figure 22A:
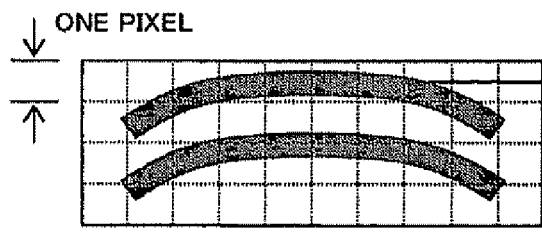
FIG. 22A and FIG. 22B are views for describing a movement detection error.
Figure 22B:
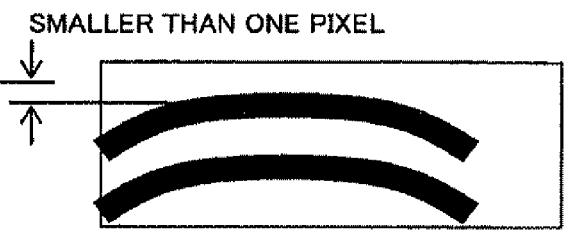

FIG. 22A and FIG. 22B are views for describing a movement amount detection error. FIG. 22A is the Nth image (partial image) of the fingerprint obtained from the finger 101 after it starts to move; FIG. 22B is the (N+1)th fingerprint image of the same.

FIG. 22A and FIG. 22B show an example in which the amount of movement made by the finger 101 in the main movement direction (the y-direction), from a position where the partial image of FIG. 22A is obtained to a position where the partial image of FIG. 22B is obtained, is smaller than one pixel of the picture image obtained by the fingerprint sensor 10 (that is, within a range of movement amount detection errors). Such a movement amount is regarded as a detection error at detecting a movement amount by the fingerprint sensor 10 and the movement amount detecting means 201. Since the minimum movement amount detected by the fingerprint sensor 10 is one pixel of an image picture obtained by the fingerprint sensor 10, such a movement amount as small as it falls within the range of detection errors, is normally assumed to be either 1 or 0 pixels.

FIG. 23A, FIG. 23B, FIG. 24A, and FIG. 24B are views for describing problems caused by such a movement amount detection error shown in FIG. 22A and FIG. 22B.

Figure 23A:
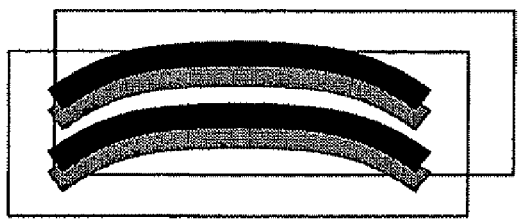
FIG. 23A and FIG. 23B are views each for describing problems caused by movement detection errors.
Figure 23B:
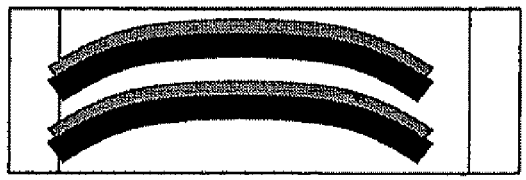

In the example of FIG. 23A, such a movement amount within the range of movement amount detection errors as shown in FIG. 22A and FIG. 22B, is assumed to be 1 pixel, and the partial images of FIG. 22A and FIG. 22B overlap each other. In the mean time, in the example of FIG. 23B, this small movement amount is assumed to be 0 pixels, and the partial images of FIG. 22A and FIG. 22B overlap each other. As illustrated in FIG. 23A and FIG. 23B, if partial images are overlapping pixel on pixel, it will cause a pixel error, thereby affecting the overlapping accuracy.

Figure 24A:
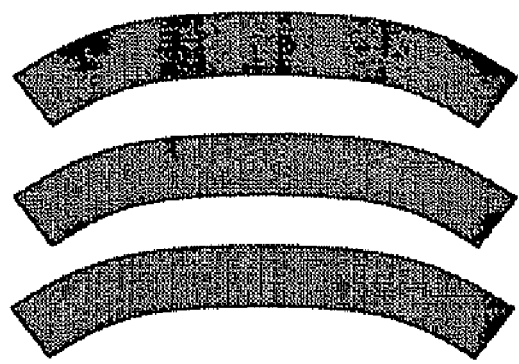
FIG. 24A and FIG. 24B are views each for describing problems caused by movement detection errors.
Figure 24B:
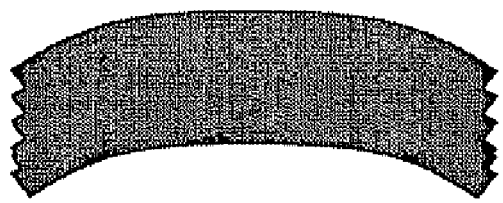

Further, FIG. 24A and FIG. 24B show an example where updating of reference images (for use in detecting a movement amount) is carried out every time the fingerprint sensor 10 obtains a partial image of the finger 101 and where movement amounts smaller than one pixel are obtained from several successive partial images. Those drawings illustrate fingerprint images formed of the successive partial images being overlapped.

FIG. 24A illustrates an overlap image obtained when a state of FIG. 23A (a state where a movement amount within a range of detection errors is detected and the amount is assumed to be 1 pixel) occurs several times consecutively. As shown in FIG. 24A, if such a detection state occurs multiple times, the detection result is significantly scaled up to an amount greatly larger than the actual length.

FIG. 24B illustrates an overlap image obtained when a state of FIG. 23B (a state where a movement amount within a range of detection errors is detected and the amount is assumed to be 0 pixels) occurs several times consecutively. As shown in FIG. 24B, if such a detection state occurs multiple times, the detection result is significantly scaled down to an amount greatly smaller than the actual length.

In this manner, if a movement amount within a range of detection errors is repeatedly detected, detection errors are accumulated, thereby greatly increasing a movement amount error, so that the verification rate will be deteriorated. Therefore, it is required to prevent the detection errors from being accumulated so that the movement amount error is minimized.

FIG. 25A through FIG. 25C are views for describing processing performed by the movement amount detecting means 201 for absorbing a detection error. Here, a description will be made on an assumption that a predetermined detection error is d pixels.

FIG. 25A and FIG. 25B show the same states as those shown in FIG. 22A and FIG. 22B, respectively. In the present embodiment, if a movement amount within a predetermined range (smaller than d pixels) of errors is repeatedly detected, the Nth partial image of FIG. 25A is kept/held as a reference image without undergoing updating thereof. Then, as shown in FIG. 25C, if a y-direction movement amount between the Nth (reference image) and the (N+K)th partial images exceeds the predetermined error range (that is, a y-direction movement amount of the finger 101 exceeds d pixels; YES route of step S15), the result of the movement amount detection is output, and the reference image is updated (replaced with the (N+K)th partial image).

With this feature, even if movement amounts within a range of detection errors are consecutively detected, the detection errors are absorbed without being accumulated so that the effects of such detection errors can be minimized. In the example of FIG. 25A through FIG. 25C, the (N+1)th through the (N+K−1)th images, in which the movement amounts are smaller than d pixels, are discarded so that such a process as of updating reference images can be skipped, thereby shortening processing time.

Figure 21:
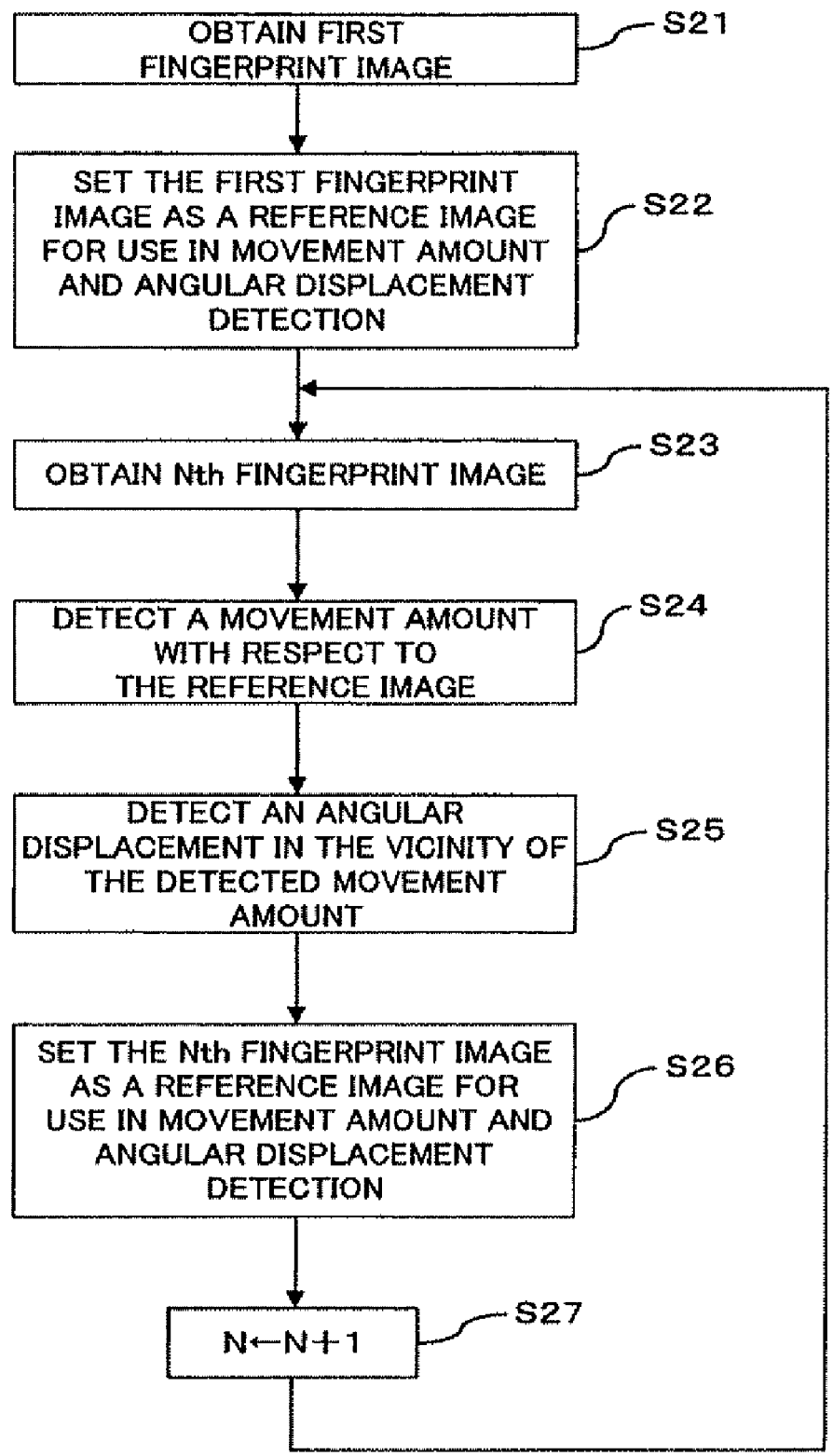
FIG. 21 is a flow chart showing procedures of detecting a movement amount of a finger and also procedures of detecting a movement direction variation according to the present embodiment.

[2-4] Movement Amount Detection/Movement Direction Variation Detection of the Present Embodiment:

FIG. 21 is a flowchart (step S21 through step S27) showing procedures of movement amount detection and movement direction variation detection according to the present embodiment. Note that, in the following description, a movement direction variation will also be called an angular displacement.

As shown in FIG. 21, the fingerprint sensor 10 obtains the first image (a partial image) of the fingerprint of the finger 101 (step S21), which image is then set as a reference image for use in detecting a movement amount and an angular displacement of the finger 101 (step S22). After that, the fingerprint sensor 10 obtains the Nth (the initial value of N is 2; N=2, 3, 4, . . . ) fingerprint image (partial image) (step S23), and the Nth fingerprint image and the reference image overlap each other, thereby producing an overlap area to detect a relative positional relationship therebetween, based on which the movement amount detecting means 201 detects an amount of movement (ΔX, ΔY) between the reference image (the (N−1) th partial image) and the Nth fingerprint image is then detected (step S24). A technique of detecting a movement amount will be detailed later with reference to FIG. 27A.

Subsequently, in the vicinity of the movement amount detected at step S24, an angular displacement of the Nth partial image in relation to a reference image (the (N−1)th partial image, here) is detected (step S25). A technique of detecting the angular displacement will be detailed later with reference to FIG. 27B.

After that, the Nth partial image is set as a reference image for use in detecting an angular displacement. More specifically, after updating the current reference image (step S26), N is incremented by 1 (step S27), and the process returns to step S23.

Figure 20:
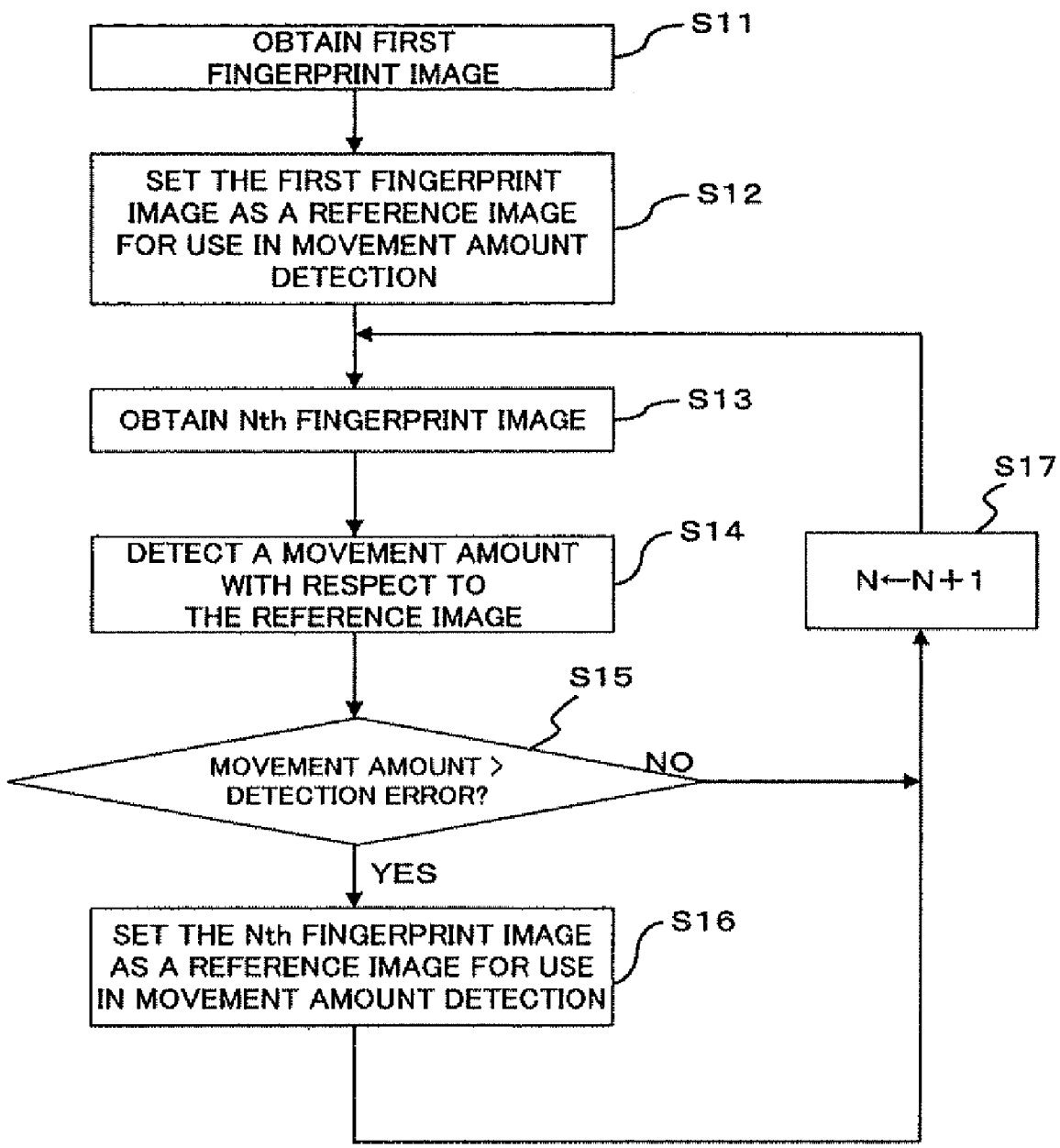
FIG. 20 is a flowchart showing procedures of detecting a movement amount of a finger and also procedures of absorbing a detection error according to the present embodiment.

Note that the processing of absorbing a movement amount detection error, which has already been described with reference to FIG. 20, is omitted in the flowchart of FIG. 21. Further, the processing of detection error absorption, which has already been described with reference to FIG. 20 and FIG. 22 through FIG. 25 in a case where the detection error is caused at movement amount detection, is likewise applicable in angular displacement (movement direction variation) detection. With this application, like effects and benefits to those which are realized at movement amount detection will also be realized in angular displacement detection.

Figure 26A:
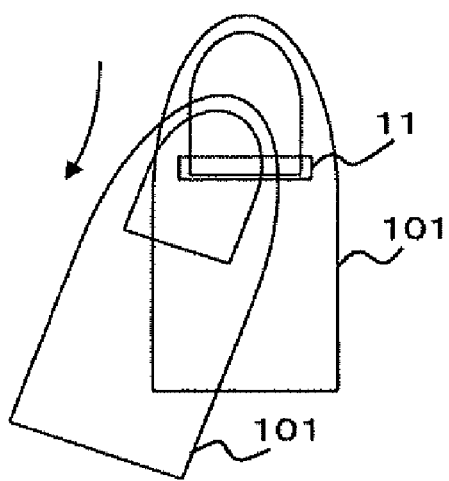
FIG. 26A through FIG. 26C are views for describing partial images obtained when a finger changes the direction in which it moves.
Figure 26B:
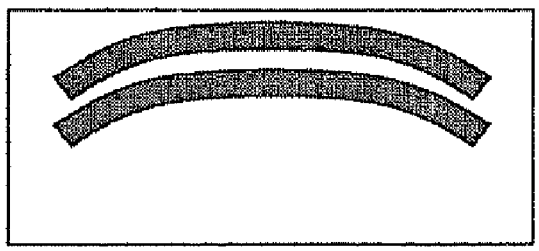
Figure 26C:
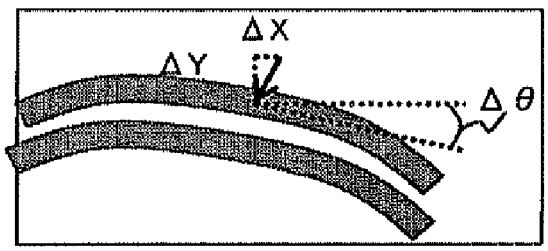

Here, FIG. 26A through FIG. 26C are views for describing partial images obtained when the finger 101 changes the direction in which it moves. FIG. 26A shows an example where the finger 101 travels with respect to the sensor surface 11, changing the direction in which it moves. FIG. 26B and FIG. 26C are the Nth (reference image) and the (N+1)th partial images, respectively, which are obtained as the finger 101 changes its movement 20 direction as shown in FIG. 26A. When the finger 101 travels as shown in FIG. 26A while changing the direction in which it moves, the following three types of quantities need to be examined: movement amounts (ΔX, ΔY) and an angular displacement Δθ, thereby necessitating a greatly increased time duration for calculation in comparison with when the finger 101 makes a simple, parallel movement. In particular, a significantly high load is caused by examination of a rotational direction (angular displacement).

Figure 27A:
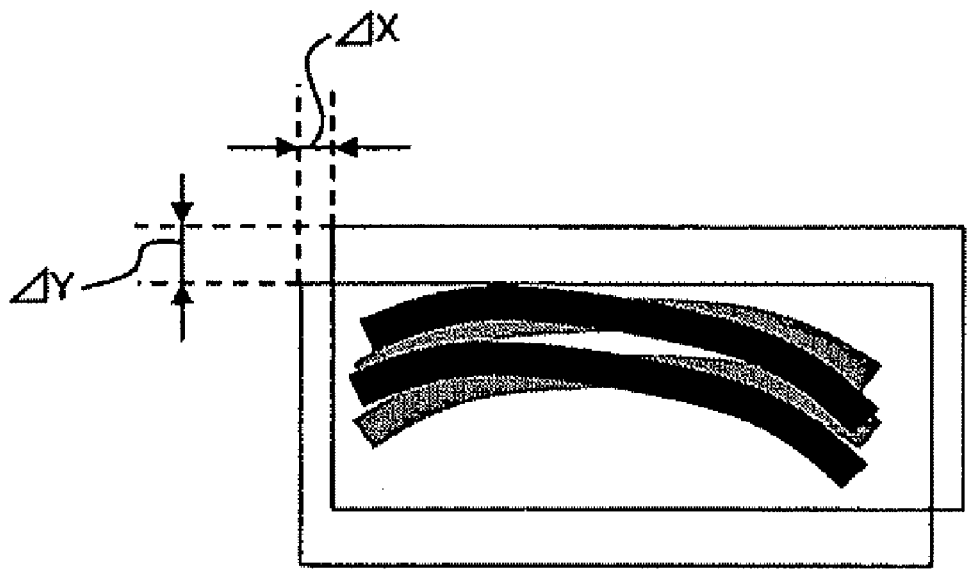
FIG. 27A and FIG. 27B are views for describing procedures of detecting a movement amount and an angular displacement (movement direction variation) of a finger when it changes the direction in which it moves.
Figure 27B:
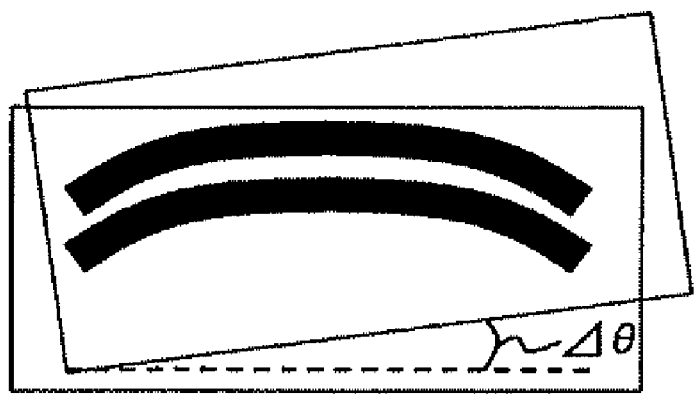

Therefore, in the present embodiment, after a movement amount is roughly detected as shown in FIG. 27A (step S24 of FIG. 21), an angular displacement is detected as shown in FIG. 27B (step S25 of FIG. 21). Here, FIG. 27A and FIG. 27B are views for describing procedures of detecting a movement amount and an angular displacement (movement direction variation) of the finger 101 when it changes its movement direction as shown in FIG. 26A. A movement amount and an angular displacement are detected from the partial images of FIG. 26B and FIG. 26C.

That is, the present embodiment detects rough movement amounts (ΔX, ΔY) alone, as shown in FIG. 27A, ignoring an angular displacement to reduce an amount of calculation (step S24 of FIG. 21). If an image obtaining time interval Δt is sufficiently short, detection errors of such movement amounts (ΔX, ΔY) can be regarded to be also sufficiently small. After that, the (N+1)th partial image is moved in parallel with the Nth partial image by the movement amounts (ΔX, ΔY) detected at step S24, and at this position, an angular displacement Δθ of the (N+1)th partial image in relation to the Nth partial image is detected (step S25 of FIG. 21). This feature makes it possible to detect movement of the finger 101 in an efficient manner.

Figure 28A:
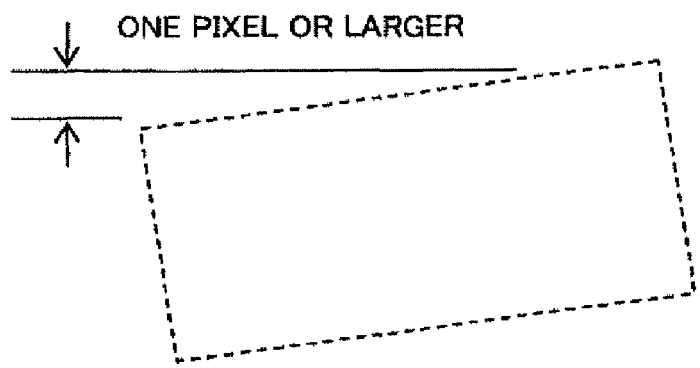
FIG. 28A and FIG. 28B are views for describing a technique for reducing a load of the angular displacement detection.
Figure 28B:
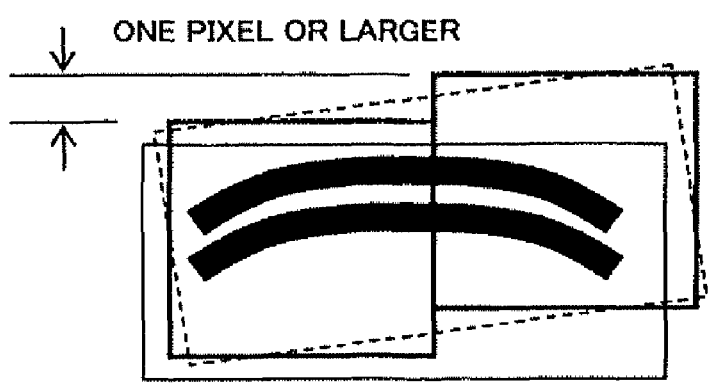

Further, FIG. 28A and FIG. 28B show a technique of thoroughly reducing the load caused by angular displacement detection. Generally speaking, if partial images are turned so as to detect an angular displacement therefrom, calculation processing load is resultantly increased. Thus, in order to reduce the calculation load, thereby improving the real-time characteristic of the present apparatus, a simplified technique of angular displacement detection is employed in the present embodiment. Provided a time interval at which picture images are obtained is sufficiently short, the angular displacement is also sufficiently minute, so that it is possible to assume that a positional difference in the y-direction between both x-direction ends of a partial image is one pixel or several pixels at the maximum (see FIG. 28A). Therefore, as shown in FIG. 28B, the partial image is divided into two or more areas (two areas in FIG. 28B), and a movement amount (ΔX, ΔY) is detected in each of the divided areas. Then, if such movement amounts differ from one another, the situation is detected as an occurrence of angular displacement.

Here, assuming an angular displacement sequentially detected is θi, a position (directional change; an angle of the finger 101 in relation to the direction in which the finger 101 travels when it starts to move) of the finger 101 is expressed by the sum total Σθi of the angular displacements. The sum total Σθi is calculated by the direction detecting means 205 as has already been described above.

Figure 29:
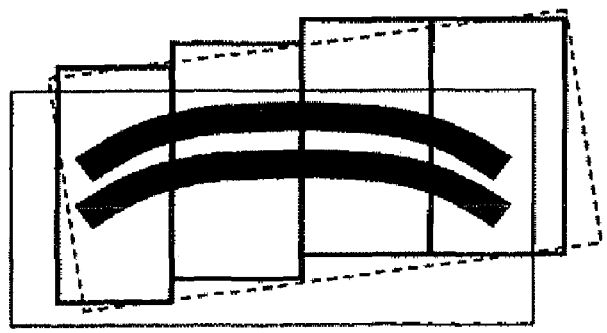
FIG. 29 is a view for describing a technique for improving the accuracy of the angular displacement detection.

FIG. 29 shows a technique of improving the accuracy of angular displacement detection according to the present embodiment. The simplified method of detecting an angular displacement, which has already been described with reference to FIG. 28A and FIG. 28B, has a problem in that the detection error becomes significantly large as in the case of movement amount detection, which has already been described with reference to FIG. 27A. For the purpose of reducing the detection error, after dividing a partial image into two or more (four in FIG. 29) areas, the mean value of the angular displacements obtained from these areas is used as an angular displacement of the partial image. Alternatively, if the movement amounts detected in each divided area are smaller than a predetermined value, it is considered that no angular displacement occurs, so that no updating is performed on the current reference image as in the case of absorbing a movement detection error. In this manner, dividing a partial image into two or more areas so as to perform detection processing therein, is effective in reducing a detection error as well as in absorbing effects caused by a distorted outer skin of the finger 101.

[3] Effects and Profits of the Biometric Information Obtaining Apparatus of the Present Embodiment:

With the biometric information obtaining apparatus of the present embodiment, the velocity detecting means 202 detects a movement velocity of the finger 101 in relation to the sweep-type fingerprint sensor 10, and the image generating means 206 generates an arbitrary pattern of which portions corresponding to a position where the finger 101 (fingerprint) is located when the movement velocity is detected is altered in position and size according to the detected movement velocity, and the arbitrary pattern is shown in real time on the display 30 while being updated consecutively in synchronization with the finger 101 traveling on the fingerprint sensor 10. As a result, it is possible for a user to be aware of a current movement of his finger 101 with respect to the fingerprint sensor 10 simply by referring to the display 30, so that the user can easily and surely learn in what way the finger 101 should be slid across the fingerprint sensor 10, thereby improving the verification performance of the apparatus and the convenience of users.

At that time, as an arbitrary pattern generated by the image generating means 206, the present embodiment employs any one of the following (already described referring to FIG. 4 through FIG. 19):

(31) a grid-like pattern;

(32) an arbitrary image (an operation instruction image or a character picture image);

(33) a path on which the finger 101 travels;

(34) a line segment or an arrow having a length according to a movement velocity detected by the velocity detecting means 202;

(35) a line segment or an arrow of a color according to a movement velocity detected by the velocity detecting means 202; and

(36) a line segment or an arrow having a thickness according to a movement velocity detected by the velocity detecting means 202, instead of a fingerprint image (see FIG. 2 and FIG. 3) formed of partial images combined, which are obtained by the fingerprint sensor 10. Here, the segments and the arrows (34) through (36) extend in directions in which the finger 101 moves.

With this feature, it is possible to show such an image or a path that corresponds to and is synthesized with movement of the finger 101 while updating the image or the path consecutively. As a result, an inappropriate movement of the finger 101, such as significantly straying from side to side, a serpentine movement, or a twist-added movement, is clearly shown on the display 30, thereby enabling a user to recognize the inappropriate movement of his finger 101 simply by referring to the display 30, so that the user can easily and surely learn a correct way in which the finger 101 should be slid across the fingerprint sensor 10.

When using the above pattern (33) through pattern (36), in particular, which are low in data amount, since it is no longer required to show a fingerprint image which is high in data amount, and the load of image processing is thus significantly reduced, so that even with a system that is slow in image processing it is still possible to show a movement of the finger 101 in real time.

Further, a graphic image (for example, the above arbitrary patterns (31) through (36)), instead of a fingerprint image itself, the original state (with no distortion thereof) of which a graphic image can be easily imagined, is shown on the display 30. Therefore, even if the present invention is introduced in a desktop PC, on which such a fingerprint image tends to be easily seen by others, it is possible for a user to recognize a distorted movement of the finger 101, without affecting security characteristics, that is, protecting the user's privacy.

Furthermore, if the evaluating means 207 recognizes that a movement velocity detected by the velocity detecting means 202 falls out of a predetermined range, or if the sideways deviation detecting means 208 detects a sideways deviation of the finger 101, or if the serpentine movement detecting means 209 detects a serpentine movement of the finger 101, or if the twist detecting means 210 detects a twist movement of the finger 101, the notifying means 211 notifies the user of such a detection result by image information and/or sound information, thereby enabling a user to recognize an inappropriate motion of his finger 101 (for example, too quick a movement of the finger 101 such that the partial images obtained by the fingerprint sensor 10 do not sufficiently overlap one another, thereby making it impossible to detect the movement velocity and to reconstruct the partial image into a fingerprint image; sideways deviation; serpentine movement; a twist-added movement), so that the user can easily and surely learn a correct way the finger 101 should be slid across the fingerprint sensor 10.

As a comparative experiment, users who had never operated a sweep-type fingerprint sensor scanned their fingers 10 times on both the present apparatus and a previous apparatus, and a rate of successful scanning, in which a verifiable fingerprint was obtained (the rate at which partial fingerprint images are successfully reconstructed into a fingerprint image), was measured. As a result, a rate of 30% was revealed in the previous apparatus, whereas a greatly improved rate of 90% was revealed in the present apparatus. This experiment indicates the users could recognize the movements of their fingers more accurately on the present apparatus so that they could learn how to slide their fingers on the sweep-type fingerprint sensor with fewer times of practicing.

On the other hand, according to the present embodiment, the movement amount detecting means 201 detects a movement amount ($\Delta X$, $\Delta Y$) for an image-obtaining time interval $\Delta t$, based on a relative positional relationship between two successive partial images obtained. On the basis of the detected movement amount and the image-obtaining time interval $\Delta t$, a movement velocity of the finger 101 is extremely easily obtained with high accuracy by the velocity detecting means 202. In addition, the position detecting means 203 accumulates such movement amounts of the finger 110, thereby extremely easily detecting a positional change of the finger 101 with high accuracy. Further, the movement direction variation detecting means 204 detects an angular displacement $\Delta\theta$ for an image-obtaining time interval $\Delta t$, based on a relative positional relationship between two successive partial images obtained, and the direction detecting means 20 accumulates such angular displacements $\Delta\theta$, thereby extremely easily detecting a movement direction change (an angle of the finger 101 in relation to a movement direction in which the finger 101 travels when it starts to move) of the finger 101 with high accuracy.

At that time, if the movement amount detected by the movement amount detecting means 201 or the angular displacement detected by the movement direction variation detecting means 204 is within a range of detection errors, the movement amount detecting means 201 or the movement direction variation detecting means 204 holds the reference image that is used in detection of the movement amount or the angular displacement, without updating thereof, until a movement amount or an angular displacement exceeding the detection error range is detected. As a result, even if movement amounts or angular displacements smaller than a predetermined value are consecutively detected, the detection errors are surely prevented from being accumulated, their effects being thereby suppressed. In addition, since the current reference image is held without being updated, reference image-updating processing can be skipped, thereby shortening processing time.

Further, as has already been described referring to FIG. 21 and FIG. 27, if the image-obtaining time interval $\Delta t$ is sufficiently short, it can be assumed that movement amount detection error is also sufficiently small. Therefore, after detection of a rough amount of movement alone of the finger 101, an angular displacement (movement direction variation) of the finger 101 is detected, thereby significantly reducing computation processing load.

[4] Others:

The present invention should by no means be limited to the above-illustrated embodiment, and various changes or modifications may be suggested without departing from the gist of the invention.

For instance, a personal computer is employed to realize an apparatus of the present invention, but the invention should by no means be limited to this and is also applicable in a similar manner to an apparatus dedicated to user authentication. In this case, like effects and benefits to those of the above embodiment will be realized.

Further, in the present embodiment, the body part is a finger, and biometric information obtained therefrom is a fingerprint image. The invention should by no means be limited to this, and the body part can be a palm, and biometric information obtained therefrom can be a palm print or a blood-vessel arrangement image or the like. In this case, also, like effects and profits to those of the above embodiment will be realized.

Still further, a computer, such as a CPU, executes predetermined application programs, thereby functioning as a movement amount detecting means 201, velocity detecting means 202, position detecting means 203, movement direction variation detecting means 204, direction detecting means 205, image generating means 206, evaluating means 207, sideways deviation detecting means 208, serpentine movement detecting means 209, twist detecting means 210, and notifying means 211 (all or part of the function of the individual means), as already described above.

Those programs are offered in the form of recording media, such as flexible discs, CD-ROMS, CD-Rs, CD-RWs, DVDs, and so on, having such programs stored thereon. In this case, a computer reads out the programs from the recording media, which are then transferred to its internal or external storage device and stored therein. At that time, the programs can be stored in storage devices (recording media), such as magnetic discs, optical discs, and magneto-optical discs, which programs are then offered from the storage devices to a computer via a communication network.

Here, a computer is defined as a concept including hardware and an OS (Operating System), or hardware operating under control of an OS. In a case where an OS is not required and an application program by itself operates hardware, the hardware itself is equivalent to a computer. Hardware includes at least a microprocessor such as a CPU and a means for reading a program from a recording medium. The above application programs contain program codes that instruct a computer to function as a movement amount detecting means 201, velocity detecting means 202, position detecting means 203, movement direction variation detecting means 204, direction detecting means 205, image generating means 206, evaluating means 207, sideways deviation detecting means 208, serpentine movement detecting means 209, twist detecting means 210, and notifying means 211, as already described above. Moreover, part of such functions can be realized by an OS instead of application programs.

Furthermore, as such recording media described above, various types of computer-readable recording media are also applicable as follows: IC cards; ROM cartridges; magnetic tapes; punch cards; internal storage devices (memories such as RAMs and ROMs) of a computer; external storage devices; printed media having any type of code, such as bar codes, printed thereon.

What is claimed is:

1. A biometric information obtaining apparatus including:
   biometric information obtaining means for reading a living individual's body part during a relative movement between the body part and said biometric information obtaining means, and for obtaining a series of partial images of the body part as biometric information;
   velocity detecting means for detecting a movement velocity at which the body part moves with respect to said biometric information obtaining means;
   evaluating means for evaluating whether the movement velocity, which is detected by said velocity detecting means, exceeds an upper limit of a permissible range, which depends on property information of said biometric information obtaining means, or is lower than a lower limit of the permissible range;
   notifying means for notifying, if the above evaluation result of said evaluating means is that the movement velocity exceeds the upper limit of the permissible range or is lower than the lower limit of the permissible range, the evaluation result outside,
   movement amount detecting means for detecting, based on a relative positional relationship between two partial images successively obtained by said biometric information obtaining means, an amount of movement of the body part for a time interval at which such partial image is obtained by said biometric information obtaining means, and
   said velocity detecting means calculating said movement velocity based on the movement amount of the body part detected by said movement amount detecting means and the time interval at which such partial image obtaining is performed,
   wherein, if the movement amount detected by said movement amount detecting means is within a range of detection errors, said movement amount detecting means holds a former one of the two partial images, which are used in detecting the movement amount, as a reference image, and newly detects such movement amount of the body part based on a relative positional relationship between said reference image and another partial image obtained subsequently to a later one of the two partial images.

2. A biometric information obtaining apparatus as set forth in claim 1, further comprising position detecting means for detecting a positional change of the body part by accumulating such movement amounts detected by said movement amount detecting means.

3. A biometric information obtaining apparatus as set forth in claim 2, further comprising:
   sideways deviation detecting means for detecting a sideways deviation of the body part based on the absolute value of the positional change, detected by said position detecting means, in a direction perpendicular to a main movement direction in which the body part is expected to move with respect to said biometric information obtaining means; and
   notifying means for notifying, if such sideways deviation is detected by said sideways deviation detecting means, about the detection result.

4. A biometric information obtaining apparatus as set forth in claim 2, further comprising:
   serpentine movement detecting means for detecting serpentine movement based on the followings: the absolute value of the positional change, detected by said position detecting means, in a direction perpendicular to a main movement direction along which the body part is expected to move with respect to said biometric information obtaining means; and the number of times the body part reverses its movement direction along the perpendicular direction; and
   notifying means for notifying, if such serpentine movement is detected by said serpentine movement detecting means, about the detection result.

5. A biometric information obtaining apparatus as set forth in claim 1, further comprising:
   movement direction variation detecting means for detecting, based on a relative positional relationship between two partial images successively obtained by said biometric information obtaining means, a movement direction variation of the body part for a time interval at which such partial image is obtained by said biometric information obtaining means; and direction detecting means for detecting a movement direction change of the body part by accumulating such movement direction variations of the body part detected by said directional change amount detecting means.

6. A biometric information obtaining apparatus as set forth in claim 5, wherein, if the movement direction variation detected by said movement direction variation detecting means is within a range of detection errors, said movement direction variation detecting means holds a former one of the two partial images, which have been used for detecting the movement direction variation, as a reference image, and newly detects such movement direction variation of the body part based on a relative positional relationship between said reference image and another partial image obtained subsequently to a later one of the two partial images.

7. A biometric information obtaining apparatus as set forth in claim 5, wherein the detection of such movement direction variation of the body part is performed after completion of the movement amount detection.

8. A biometric information obtaining apparatus as set forth in claim 5, further comprising:
   twist detecting means for detecting, based on the movement direction change detected by said direction detecting means, twist movement of the body part as a situation where the two partial images, for use in detecting the movement velocity by said velocity detecting means, cross each other; and
   notifying means for notifying, if such twist movement of the body part is detected by said notifying means, about the detection result.

9. A biometric information obtaining apparatus as set forth in claim 1, wherein said biometric information obtaining means obtains such series of partial images of the body part as registration biometric information, which is previously registered for use in user authentication, said registration biometric information being compared, for verification, with verification biometric information, which is obtained from a user to be verified at the time of user authentication.

10. A biometric information obtaining apparatus as set forth in claim 1, wherein said biometric information obtaining means obtains such series of partial images of the body part as verification biometric information, which is obtained from a user to be verified at the time of user authentication, said verification biometric information being compared with registration biometric information for verification.

11. A biometric information obtaining apparatus as set forth in claim 1, wherein a maximum of the permissive range is determined based at least on the following properties of said biometric information obtaining means: a size of each of the partial images obtained by said biometric information obtaining means; a minimum of overlapping between the partial images, which value is required for detecting the movement velocity by said velocity detecting means; and a time interval at which such partial image is obtained by said biometric information obtaining means.

* * * * *